US012542904B2

(12) United States Patent
Sychev et al.

(10) Patent No.: US 12,542,904 B2

(45) Date of Patent: Feb. 3, 2026

(54) HANDLING TRAILING BITS IN ARITHMETIC ENCODING AND DECODING

(71) Applicant: HUAWEI TECHNOLOGIES CO., LTD., Shenzhen (CN)

(72) Inventors: Maxim Borisovitch Sychev, Moscow (RU); Andrey Soroka, Munich (DE); Elena Alexandrovna Alshina, Munich (DE); Sergey Yurievich Ikonin, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 69 days.

(21) Appl. No.: 18/495,514

(22) Filed: Oct. 26, 2023

(65) Prior Publication Data

US 2024/0056577 A1 Feb. 15, 2024

Related U.S. Application Data

(63) Continuation of application No. PCT/RU2021/000172, filed on Apr. 26, 2021.

(51) Int. Cl.

*H04N 19/13* (2014.01)

*H04N 19/184* (2014.01)

(Continued)

(52) U.S. Cl.

CPC ........... *H04N 19/13* (2014.11); *H04N 19/184* (2014.11); *H04N 19/436* (2014.11); *H04N 19/46* (2014.11)

(58) Field of Classification Search

CPC .... H04N 19/13; H04N 19/184; H04N 19/436; H04N 19/46; H04N 19/14; H04N 19/18;

(Continued)

(56) References Cited

U.S. PATENT DOCUMENTS

| | | | | |
|---|---|---|---|---|
| 5,781,136 | A * | 7/1998 | Imanaka | H04N 1/417 341/52 |
| 8,634,474 | B2 | 1/2014 | Matsuba et al. | |
| 8,782,379 | B2 * | 7/2014 | Liu | H03M 7/4006 712/223 |
| 9,455,743 | B2 * | 9/2016 | Zhou | G06F 9/30025 |

(Continued)

FOREIGN PATENT DOCUMENTS

| | | |
|---|---|---|
| JP | 2016508331 A | 3/2016 |
| JP | 2018198447 A | 12/2018 |

(Continued)

OTHER PUBLICATIONS

G.N.N. Martin (hereinafter Martin) "Range encoding: an algorithm for removing redundancy from digitized message", IBM UK Scientific Center, Mar. 1979 to Video & Data Recording Conference, held in Southampton, Jul. 24-27, 1979 (Year: 1979).*

(Continued)

*Primary Examiner* — Dramos Kalapodas

(74) *Attorney, Agent, or Firm* — Leydig, Voit & Mayer, Ltd.

(57) ABSTRACT

Methods and apparatuses are provided to encode data into a bitstream and to decode data from a bitstream. According to the method, the length of the bitstream can be reduced by including only the relevant significant bits within the trailing bits of the encoding process. The amount of these leading trailing bits is determined and the trailing bits, which have the least amount, can be constructed. Indications of the amount of leading trailing bits are included into the bitstream. Therefore, padding is not required, resulting in less bits, which need to be signaled.

25 Claims, 22 Drawing Sheets

| | | | | | | | | | | | | | | | | | |
|---|---|---|---|---|---|---|---|---|---|---|---|---|---|---|---|---|---|
| Low | 0 | 0 | 0 | 0 | 0 | 1 | 0 | 0 | 0 | 1 | 1 | 0 | 0 | 0 | 1 | 1 | 1610 |
| Range | 0 | 0 | 0 | 0 | 0 | 0 | 0 | 0 | 0 | 1 | 0 | 0 | 0 | 0 | 1 | 1 | 1620 |
| High-1 | 0 | 0 | 0 | 0 | 0 | 1 | 0 | 0 | 1 | 0 | 1 | 0 | 0 | 1 | 0 | 1 | 1630 |
| (Low + Range - 1) XOR Low | 0 | 0 | 0 | 0 | 0 | 0 | 0 | 0 | 1 | 1 | 0 | 0 | 0 | 1 | 1 | 0 | 1640 |
| chosen trailing bits | 0 | 0 | 0 | 0 | 0 | 1 | 0 | 0 | 1 | 0 | 0 | 0 | 0 | 0 | 0 | 0 | 1650 |

1660 1670 1680

(51) Int. Cl.
*H04N 19/436* (2014.01)
*H04N 19/46* (2014.01)

(58) Field of Classification Search
CPC ...... H04N 19/463; H04N 19/70; H04N 19/91; H04N 19/11; H04N 19/159; H04N 19/176; H04N 19/593; H04N 19/105
See application file for complete search history.

(56) References Cited

U.S. PATENT DOCUMENTS

| | | | | |
|---|---|---|---|---|
| 9,729,169 | B2 | 8/2017 | Kalevo et al. | |
| 9,892,188 | B2 | 2/2018 | Sullivan et al. | |
| 10,205,965 | B2 | 2/2019 | Hannuksela | |
| 10,862,508 | B1 | 12/2020 | Zhao et al. | |
| 2007/0296613 | A1* | 12/2007 | Hussain | H04N 19/42 375/E7.093 |
| 2007/0297501 | A1* | 12/2007 | Hussain | H04N 19/197 375/E7.199 |
| 2021/0092454 | A1* | 3/2021 | Coban | H04N 19/182 |

FOREIGN PATENT DOCUMENTS

| | | | |
|---|---|---|---|
| JP | 2020017993 | A | 1/2020 |
| JP | 2023548750 | A | 11/2023 |
| WO | 2020146547 | A1 | 7/2020 |

OTHER PUBLICATIONS

CCIT Recommendation T.81, approved on Sep. 1992 and titled "Information Technology-Digital Compression Coding of Continuous-Tone Still Images—Requirements and Guidelines" © ITU 1993 (Year: 1993).*

Wang et al., "A CAVLC Decoding Architecture Based on FSM for Real-Time HD Application," 2009 Second International Workshop on Computer Science and Engineering, XP03162235, Total 4 pages (Oct. 2009).

Sze et al., "Entropy Coding in HEVC," High Efficiency Video Coding (HEVC), https://www.researchgate.net/publication/290180658, Total 68 pages (Jun. 2014).

Hsu et al., "Unified End-of-Slice Detection for LCEC and CABAC," Joint Collaborative Team on Video Coding (JCT- VC) of ITU-T SG16 WP3 and ISO/IEC JTC1/SC29/WG11, JCTVC-E042, XP31622357, Total 6 pages (Mar. 16-23, 2011).

Chen et al., "An Overview of Core Coding Tools in the AV1 Video Codec," 2018 Picture Coding Symposium (PCS), IEEE, Total 5 pages, Institute of Electrical and Electronics Engineers, New York, New York (Jun. 2018).

Bross et al., "Versatile Video Coding (Draft 7)," Joint Video Experts Team (JVET) of ITU-T SG 16 WP 3 and ISO/IEC JTC 1/SC 29/WG 11 JVET-P2001-vE, Total 494 pages (Oct. 1-11, 2019).

Martin et al., "*Range encoding: an algorithm for removing redundancy from a digitised message," Presented in Mar. 1979 to the Video and Data Recording Conference, held in Southampton, Total 11 pages (Jul. 24-27, 1979).

Kirchhoffer et al., "[NNR] HLS for parallel CABAC decoding including parameter optimizations," International Organisation for Standardisation Organisation Internationale De Normalisation ISO/IEC JTC1/SC29/WG 4 m55066, Coding of Moving Pictures and Audio, Total 5 pages (Oct. 2020).

"Test Model of Essential Video Coding (ETM4.0)," International Organisation for Standardisation Organisation Internationale De Normalisation ISO/IEC JTC 1/SC 29/WG 11 N18775, Coding of Moving Pictures and Audio, Total 24 pages (Oct. 2019).

* cited by examiner

Step 1
HIGH
TOP
BOTTOM
740
750
760
710a
720a
Low1 + Range1 = 199
Low1 = 71

Step 2
710b
720b
Low2 + Range2 = 170
Low2 = 71+35 = 106

Step 3
710c
720c
Low3 + Range3 = 115
Low3 = 106 + 5 = 111

Step 4
710d
710e
720d
730
731
STREAM
Low4 + Range4 = 204
Range4 = (4 << 2) & HIGH = 16
Low4 = (111 << 2) & HIGH = 188

HANDLING TRAILING BITS IN ARITHMETIC ENCODING AND DECODING

CROSS-REFERENCE TO RELATED APPLICATIONS

This application is a continuation of International Application No. PCT/RU2021/000172, filed on Apr. 26, 2021, the disclosure of which is hereby incorporated by reference in its entirety.

FIELD

Embodiments of the present disclosure relate to arithmetic encoding and decoding. In particular, embodiments of the present disclosure relate to handling of trailing bits and especially to their including into the bitstream and parsing from the bitstream.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, mobile device video recording, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, VP8, VP9, AV1, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-TH.266, Versatile Video Coding (VVC) and extensions, such as scalability and/or three-dimensional (3D) extensions, of these standards.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

The encoding and decoding of the video may be performed by standard video encoders and decoders, compatible with H.264/AVC, HEVC (H.265), VVC (H.266) or other video coding technologies, for example. Moreover, the video coding or its parts may be performed by neural networks.

In any encoding or decoding or still pictures or images or other source signal such as feature channels of a neural network, entropy coding has been widely used. In particular, arithmetic coding has gained importance in the newer coding approaches. Thus, improving the efficiency of entropy coding may be desirable.

SUMMARY

Embodiments of the present disclosure provide apparatuses and methods for arithmetic encoding of data into a bitstream and arithmetic decoding of data from a bitstream, which includes coded bits and leading trailing bits.

According to an embodiment, a method is provided for arithmetic encoding of input data into a bitstream, comprising: arithmetically encoding the input data into coded bits and trailing bits; including into the bitstream the coded bits; determining a minimum value and a maximum value of an interval of the arithmetically encoded input data; determining an amount of leading trailing bits which: are consecutive trailing bits, and have the same value within first Most Significant Bits (MSBs), representing the determined maximum value as within second MSBs representing the determined minimum value; and including into the bitstream: an indication of the determined amount of the leading trailing bits, and the leading trailing bits.

The inclusion of the leading trailing bits instead of the full trailing bits into the bitstream may reduce the amount of bits within the bitstream and thus, e.g., reduce the rate at the same quality. In other words, the determined leading trailing bits alone (without the remaining trailing bits) are sufficient to define the range interval, and thus, the remaining trailing bits do not have to be included into the bitstream and can be reconstructed at the decoder based on the indicated amount of the leading trailing bits. This may save rate without deteriorating the quality.

According to an implementation, the amount of the leading trailing bits, NumTrailingBits, is determined by: NumTrailingBits=CLZ((LOW+RANGE−1) XOR LOW), CLZ( ) is count of leading zeros, LOW is the minimum value of the interval and RANGE is the range of the interval.

The amount of leading trailing bits may be determined exactly instead of, for example, rounding to the nearest byte boundary. Thereby, one may further reduce the amount of bits within the bitstream.

For example, the indication of the amount of the leading trailing bits precedes the coded bits and the leading trailing bits within the bitstream.

An indication of the amount of leading bits preceding the coded bits and the leading trailing bits within the bitstream may enable an efficient extraction from the bitstream without buffering the entire bitstream.

In an implementation, to the leading trailing bits, one bit with value one is postpended before the inclusion into the bitstream.

Such approach may be used alternatively to leaving out the one-value bit. As mentioned in the detailed description, currently—in some known codecs such as video codecs, the one-value bit is indicated in the bitstream.

In particular, the step of arithmetic encoding, the determining a minimum value and a maximum value of an interval, and the determining an amount of leading trailing bits is performed separately for a first substream and a second substream, resulting in first coded bits, second coded bits, first leading trailing bits and second leading trailing bits; and the method includes inserting, into the bitstream, the first coded bits and the second coded bits followed by the first leading trailing bits and the second leading trailing bits.

Such an independent application of the method on two separate substreams provides a prerequisite for parallelization.

For example, the method further comprises multiplexing the first coded bits and the second coded bits into the bitstream together with a first length indication indicating length of the first coded bits, and a second length indication indicating length of the second coded bits.

Indicating the length of the substreams in the bitstream enables provision of substreams with different sizes and may thus help to achieve a more flexible bitstream composition.

In an implementation, the first length indication precedes the first coded bits within the bitstream, and the second length indication precedes the second coded bits within the bitstream.

An advantage of this bitstream structure may be the possibility of immediate encoding or decoding of the substream without need to buffer a plurality of substreams and the respective indications.

For example, the second length indication precedes the first coded bits within the bitstream.

Providing the length indications concatenated before the coded bits may enable a faster extraction of individual parts of the bitstream.

For example, the indication of the amount of the second leading trailing bits precedes the first coded bits within the bitstream.

Such a bitstream structure enables an even faster extraction of individual parts of the bitstream and makes the bitstream more suitable for parallel decoding.

In an implementation, the method further comprises padding the bitstream including the first coded bits, the second coded bits, the first leading trailing bits and the second leading trailing bits with bits having predetermined values so as to align the bitstream length to match an integer multiple of a predetermined amount of bytes.

Such approach may provide a bitstream e.g. appropriately aligned for further processing such as encapsulation into network adaption layer units or other packets.

Further, the arithmetic encoding includes encoding the first substream with a first arithmetic encoder and encoding the second substream with a second arithmetic encoder, and the arithmetic encoding with the first arithmetic encoder and the second arithmetic encoder are performed at least partly in parallel.

The above-mentioned possibility to perform the encoding method on at least two substream separately enables parallel encoding. This may help to facilitate an improved encoding efficiency.

In an implementation, the arithmetic encoding is a range encoding.

Range encoding may be particularly suitable for hardware and software architectures with limited register or generally fast memory size.

For example, during the arithmetic encoding current minimum value and the current maximum value of the interval are stored in a memory of a preconfigured size; the including the coded bits into the bitstream includes moving a predefined amount of bits out of stable bits from the memory into the bitstream; and the stable bits are consecutive bits which have the same value in MSBs of the binary representation of the current minimum value and the current maximum value.

Outputting coded bits in parts larger than one bit may provide for a more efficient software and/or implementation.

In an implementation, during the arithmetic encoding the amount of leading trailing bits is close to the predefined amount of bits out of stable bits; trailing coded bits are generated from the leading trailing bits by postpending one bit with value one followed by zeros up to the predefined amount of bits out of stable bits; the trailing coded bits are included into the coded bits before the inclusion of the coded bits into the bitstream; and an indication of zero leading trailing bits is included into the bitstream.

Thus, the increased signaling effort of many leading trailing bits together with the indication of the amount of trailing bits may be avoided. Instead the signaling effort may be reduced to have more coded bits and signal zero leading trailing bits.

According to an embodiment a method is provided for arithmetic decoding of data from a bitstream, comprising: extracting an indication of an amount of leading trailing bits from the bitstream; extracting a plurality of coded bits from the bitstream; extracting, from the bitstream, the leading trailing bits specified by the extracted indication of the amount of the leading trailing bits; determining trailing bits including postpending to the extracted leading trailing bits zeros up to a predetermined maximum length of the trailing bits; and arithmetically decoding a coded value represented by bits including the coded bits and the determined trailing bits, thereby obtaining said data.

The reconstruction of the trailing bits from the leading trailing bits provides the decoding from coded bits and trailing bits using a smaller amount of bits within the bitstream.

For example, the determining of the trailing bits consists of postpending to the extracted leading trailing bits one bit with value one, followed by zeros up to the predetermined maximum length of the trailing bits.

This approach enables reconstructing the complete output of the arithmetic encoder, thereby providing a particularly appropriate input to an arithmetic decoder.

In an implementation, the indication of the amount of the leading trailing bits precedes the coded bits and the leading trailing bits within the bitstream.

This bitstream structure may provide a more efficient extraction from the bitstream.

In an implementation, the method includes extracting, from the bitstream, first coded bits and second coded bits followed by first leading trailing bits and second leading trailing bits, the first coded bits and the first leading trailing bits forming a first substream, the second coded bits and the second leading trailing bits forming a second substream; and determining first trailing bits for the first substream, determining second trailing bits the second substream, arithmetically decoding a first coded value represented by first bits including the first coded bits and the determined first trailing bits; and arithmetically decoding a second coded value represented by second bits including the second coded bits and the determined second trailing bits.

Such an independent application of the method on two separate substreams may result in a more efficient decoding process and provides a prerequisite for parallelization.

For example, the method is further comprising extracting the first coded bits and the second coded bits from the bitstream together with a first length indication indicating length of the first coded bits, and a second length indication indicating length of the second coded bits.

Indicating the length of the substreams in the bitstream enables provision of substreams with different sizes and may thus lead to a more flexible bitstream composition.

In an implementation, the first length indication precedes the first coded bits within the bitstream, and the second length indication precedes the second coded bits within the bitstream.

An advantage of this bitstream structure may be the possibility of immediate decoding of the substream without need to buffer a plurality of substreams and the respective indications. Thereby, it may be achieved to facilitate processing flows.

For example, the second length indication precedes the first coded bits within the bitstream.

Providing the length indications concatenated before the coded bits may enable a faster extraction of individual parts of the bitstream.

For example, the indication of the amount of the second leading trailing bits precedes the first coded bits within the bitstream.

Such a bitstream structure provides a further possibility for a faster extraction of individual parts of the bitstream.

In an implementation, the method is further comprising discarding the remaining bits of the bitstream after extracting the first coded bits, the second coded bits, the first leading trailing bits and the second leading trailing bits.

Such approach may provide a bitstream e.g. appropriately aligned for further processing such as encapsulation into network adaption layer units or other packets.

For example, the arithmetic decoding includes decoding the first substream with a first arithmetic decoder and decoding the second substream with a second arithmetic decoder, and the arithmetic decoding with the first arithmetic decoder and the second arithmetic decoder are performed at least partly in parallel.

A parallel decoding of substreams may result in a faster decoding of the full bitstream.

In an implementation, the arithmetic decoding is a range decoding.

Range encoding may be particularly suitable for hardware and software architectures with limited register or generally fast memory size.

In an implementation, a computer program stored on a non-transitory medium and including code instructions, which, when executed on one or more processors, cause the one or more processor to execute steps of any of the methods described above.

According to an embodiment an apparatus is provided for arithmetic encoding of input data into a bitstream, comprising: processing circuitry configured to: arithmetically encode the input data into coded bits and trailing bits; include into the bitstream the coded bits; determine a minimum value and a maximum value of an interval of the arithmetically encoded input data; determine an amount of leading trailing bits which: are consecutive trailing bits, and have the same value within first MSBs representing the determined maximum value as within second MSBs representing the determined minimum value; and include into the bitstream: an indication of the determined amount of the leading trailing bits, and the leading trailing bits.

According to an embodiment an apparatus is provided for arithmetic decoding of data from a bitstream, comprising: processing circuitry configured to: extract an indication of an amount of leading trailing bits from the bitstream; extract a plurality of coded bits from the bitstream; extract, from the bitstream, the leading trailing bits specified by the extracted indication of the amount of the leading trailing bits; determine trailing bits including appending to the extracted leading trailing bits zeros up to a predetermined maximum length of the trailing bits; and arithmetically decode a coded value represented by bits including the coded bits and the determined trailing bits, thereby obtaining said data.

The apparatuses provide the advantages of the methods described above.

Embodiments of the present disclosure can be implemented in hardware (HW) and/or software (SW) or in any combination thereof. Moreover, HW-based implementations may be combined with SW-based implementations.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

DETAILED DESCRIPTION

Figure 1:
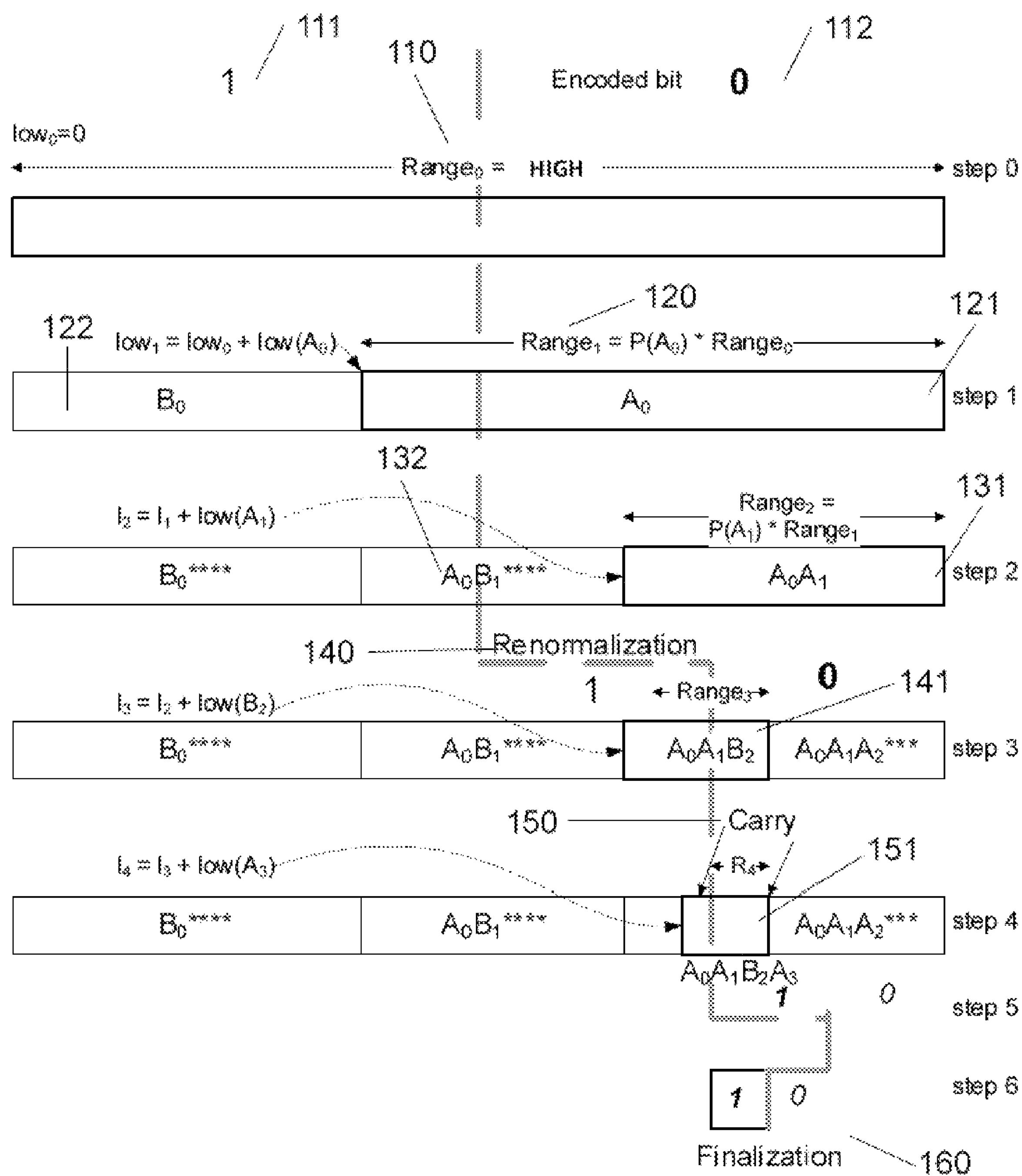
FIG. 1 is a schematic drawing illustrating encoding of a message using an alphabet with two symbols with an arithmetic coding.

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of method steps is described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission errors or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Arithmetic Encoding

Entropy coding is typically employed as a lossless coding. Arithmetic coding is a class of entropy coding, which encodes a message as a binary real number within an interval (a range) that represents the message. Herein, the term message refers to a sequence of symbols. Symbols are selected out of a predefined alphabet of symbols. For example, an alphabet may consist of two values 0 and 1. A message using such alphabet is then a sequence of bits. The symbols (0 and 1) may occur in the message with mutually different frequency. In other words, the symbol probability may be non-uniform. In fact, the less uniform the distribution, the higher is the achievable compression by an entropy code in general and arithmetic code in particular. Arithmetic coding makes use of an a priori known probability model specifying the symbol probability for each symbol of the alphabet.

An alphabet does not need to be binary. Rather, the alphabet may consist e.g. of 8 values 0 to 7. In general, any alphabet with any size may be used. Typically, the alphabet is given by the value range of the coded data.

The interval representing the message is obtained by splitting an initial range according to probabilities of the alphabet symbols, with which the message is coded.

For example, let the current interval be the initial interval [0, 1) at the beginning. For each symbol of the message, the following two steps are performed:

1) subdividing the current interval into subintervals, one for each possible alphabet symbol. The size of a symbol's subinterval is proportional to the estimated probability that the symbol will be the next symbol in the message according to the probability model (of the symbol source).
2) selecting the subinterval corresponding to the symbol that actually occurs next in the message, and making the selected subinterval the new current interval.

As a third step, enough bits are output to distinguish the current interval from all other possible intervals. This step may be performed already during the encoding in steps 1 and 2, or after the encoding of the entire message. The length of the interval obtained after repeating steps 1) and 2) for all symbols of the message is clearly equal to the product of the probabilities of the individual symbols, which is also the probability of the particular sequence of symbols in the message.

In theory, an arithmetic coder recursively splits the interval from 0 to 1 to encode the message of any length, resulting in smaller and smaller intervals. In practice, systems are limited by a finite bit depth—only discrete values are representable. Thus, the smaller the interval, the higher precision arithmetic would be necessary. Moreover, no output would be produced until the entire message has been read. A solution to both of these problems may be to output some bits as soon as they are known, and then to double the length of the current interval for each output bit so that it reflects only the (still) unknown part of the interval. In practice, the arithmetic can be done by storing the current interval in sufficiently long integers rather than in floating point or exact rational numbers.

A variation of the arithmetic coder improved for a practical use is referred to as a range coder, which does not use the interval [0,1), but a finite range of integers, e.g. from 0 to 255. This range is split according to probabilities of the alphabet symbols. The range may be renormalized if the remaining range becomes too small in order to describe all alphabet symbols according to their probabilities.

Regarding the terminology employed herein, a current interval is given by its minimum value (denoted as LOW) and its maximum value (denoted as HIGH). The length of the interval is denoted as RANGE. In general, HIGH=LOW+RANGE, and the RANGE is expressed in number of the minimum sized (distinguishable) subintervals. The minimum range for encoding a symbol is BOTTOM. This minimum range ensures that the least likely symbols still have a valid range of at least 1. In other words, BOTTOM is a design parameter, which may be determined based on the alphabet symbols and their probability, to ensure that the range can still be divided into distinguishable intervals corresponding to all alphabet symbols.

The HIGH position indicates how many bits are required to cover the initial maximum range. The BOTTOM position indicates how many bits are required to cover the minimum range for encoding another symbol. The amount of bits between the HIGH position and the predetermined TOP position corresponds to minimum portion of bits, which can be streamed (inserted) into the bitstream and which become coded bits.

FIG. 1 schematically illustrates a procedure of arithmetic coding. A message to be coded is provided in an alphabet with two possible symbols A and B. The symbols of the alphabet {A, B} have the probabilities P(A)=⅔ and P (B)=⅓. The message to be encoded reads AABA.

Step 0 shows the initial interval with the length $Range_0$ 110 corresponding here to HIGH, since initially, LOW=0 (in step 0 $low_0$=0). In the lower half of $Range_0$ the leading bit of the binary representations of the numbers within $Range_0$ is 1 111, whereas in the upper half of $Range_0$ the leading bit is 0 112. In other words, a current interval in any of the steps, which falls into the upper half of the initial range, will have the first leading bit 0, whereas the current interval, which falls into the lower half of the initial range, will have the first leading bit 1. Assuming here e.g. that any number (code value) within the initial range is representable by 8 bits, the range is from 0 to 255, so that HIGH=255.

In step 1, $Range_0$ is divided according to the probabilities and to encode the first symbol $A_0$. In this example, the initial interval is split into two intervals with sizes ⅓ 122 (corresponding to symbol $B_0$) and ⅔ 121 (corresponding to symbol $A_0$) of the total range size. Dividing according to the probabilities means that the initial interval is split into a number of subintervals equal to the number of symbols in the alphabet (here two symbols A and B) and the sizes of the intervals are proportional to the respective probabilities of the symbols represented by the intervals. The upper subinterval $Range_1=P(A_0)*Range_0$, corresponding to the message symbol $A_0$ is then selected as current interval for the next step.

In step 2, the range of the symbol $A_0$, $Range_1$ 120, is divided according to the probabilities. The next message symbol is A. As the remaining $Range_2=P(A_1)*Range_1$, which describes the message $A_0A_1$ 131, lies completely within the upper half of the $Range_0$ to be encoded with bit 0, adding the bit 0 to the encoded bitstream is performed. In this particular implementation, a bit is added into the bitstream as soon as it can be, and a renormalization 140 is performed to double the resolution. The current maximum range is now the upper half of the initial range of step 0. The upper half of this current maximum range is assigned to bit 0 and lower half of the current maximum range is assigned to bit 1.

The message $A_0A_1B_2$ 141 in step 3 still cannot be encoded unambiguously, as $Range_3$ overlaps with a bit 1 (the corresponding bottom half of the current maximum range) as well as with a bit 0 (the corresponding top half of the current maximum range), thus a carrying 150 is performed. Nothing is streamed (no bit is included into the bitstream). $Range_3$ is divided in step 4 according to the probabilities of the symbols of the alphabet.

Now the message to be encoded reads $A_0A_1B_2A_3$ 151. $Range_4$ still overlaps with both possible bits and as there is no further symbol to be encoded, in step 5 and 6 a finalization 160 is performed. This includes several renormalizations, which are performed to create the unambiguous code 0011 for the message AABA.

FIGS. 2 to 7D show an example for a range encoder in which the eight symbols of the alphabet 220 {0, 1, 2, 3, 4, 5, 6, 7} have probabilities according to a probability density function PDF 230 for a standard normal distribution. The symbols are mapped onto the range by the cumulative distribution function CDF 240. The message to be encoded reads 4420. The maximum starting range HIGH for encoding is represented in this example by 8 bits corresponding to a code value of 255. The minimum range for encoding a symbol is BOTTOM=16 in this example. This minimum range ensures that even the least likely symbols "0" and "7" still have a valid range of at least 1 when the cumulative distribution function is applied. For example, the normal distribution results in the following number of the smallest intervals per the eight symbols: 1, 1, 2, 3, 4, 2, 2, 1.

Figure 2:
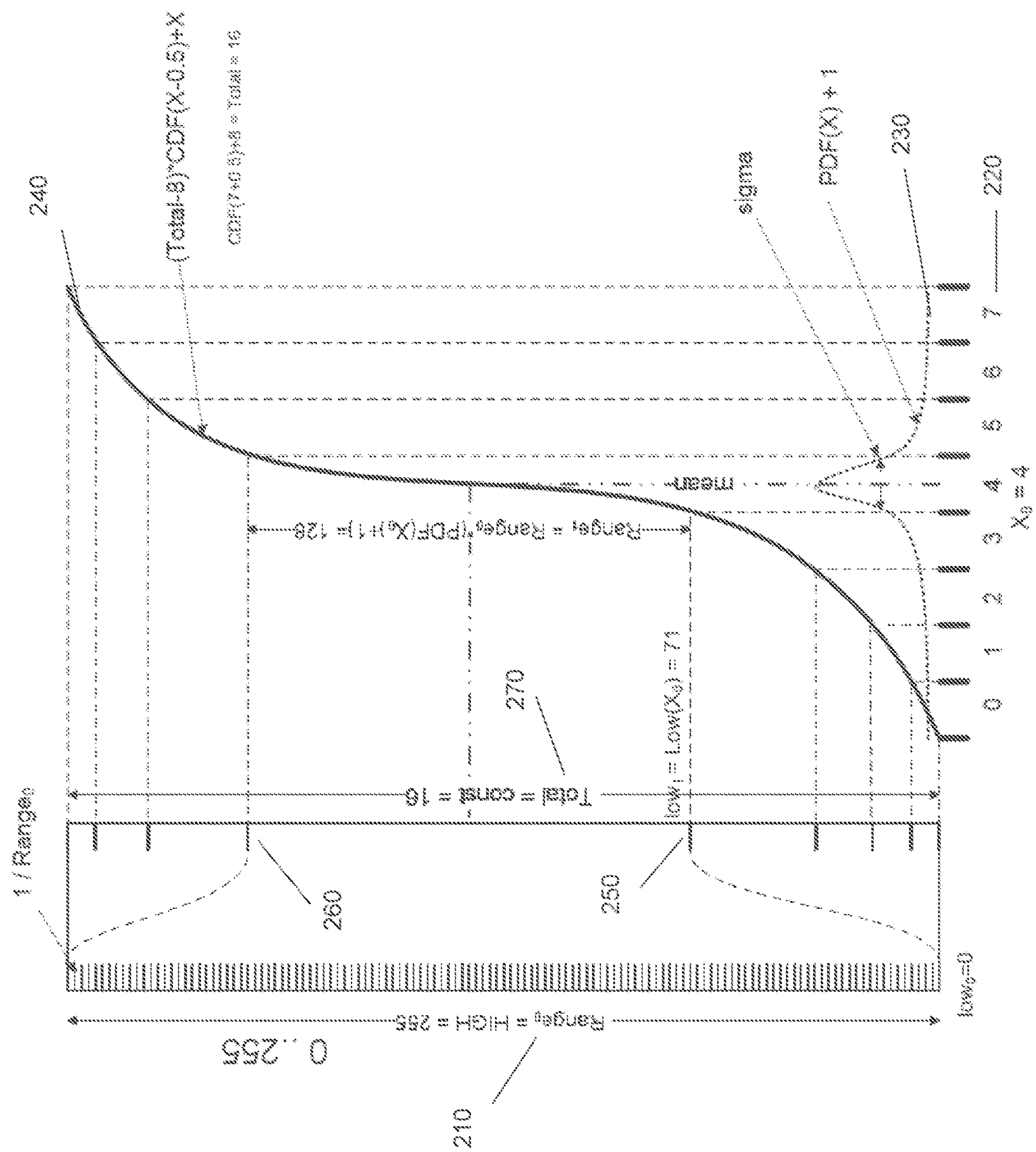
FIG. 2 is a schematic drawing of a first step of an arithmetic (range) coding of a message using an alphabet with eight symbols.

FIG. 2 illustrates that the initial range 210 $Range_0$=HIGH=255=1111 1111.b, where .b is the binary representation of a number, is mapped onto the symbols 220 of the alphabet according to the Gaussian probability density function PDF 230. The partitioning of $Range_0$ is obtained from the cumulative distribution function CDF 240. This implies that the first symbol of the message to be encoded, namely "4", is represented by any of the code values in the interval with the lower endpoint 250 $Low_1$=71=0100 0111.b and the excluded upper endpoint 260 $Low_1$+$Range_1$=199=1100 0111.b, which corresponds to a $Range_1$=128. The total=const=16 270 implies a working precision of 1/16. This indicates that the subrange which is assigned to the least likely symbol is 1/total=1/16 of the current range. The total 270 is determined by the cumulative distribution function.

Figures 7A, 7B, 7C, 7D:
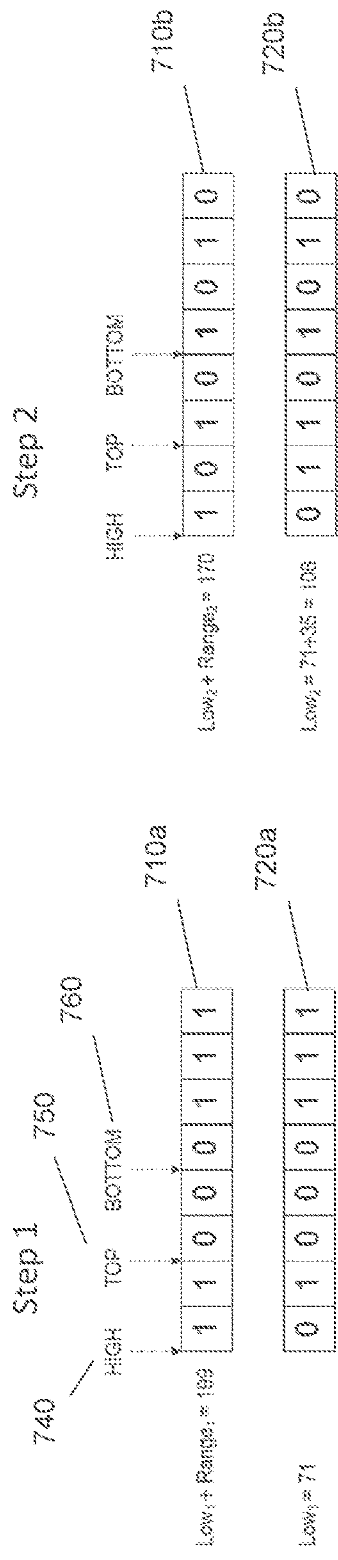
FIG. 7A-D are schematic drawings illustrating the values of a minimum and a maximum of the range during the coding steps, expressed as binary numbers.

The binary representation of this interval is shown in FIG. 7A together with indications of the HIGH, TOP and BOTTOM positions. The HIGH position 740 indicates how many bits are required to cover the initial maximum range (in this case 8). The BOTTOM position 760 indicates how many bits are required to cover the minimum range for encoding another symbol (in this case 4). The amount of bits between the HIGH position 740 and the predetermined TOP position 750 corresponds to a minimum portion of bits, which can be streamed (inserted) into the bitstream and which then become coded bits. For arithmetic coding described above with reference to FIG. 1, there is only one bit between the HIGH position 740 and the TOP position 750. For range coding of this example, there are two bits between the HIGH position 740 and the TOP position 750. In FIG. 7A (as well as FIGS. 7B-7D) the minimum of the interval 720_a-d_ and the maximum of the interval 710_a-d_ are represented binary.

This may correspond in practice to two registers used for the purpose of storing the current interval and thus, the current result of the encoding.

Figure 3:
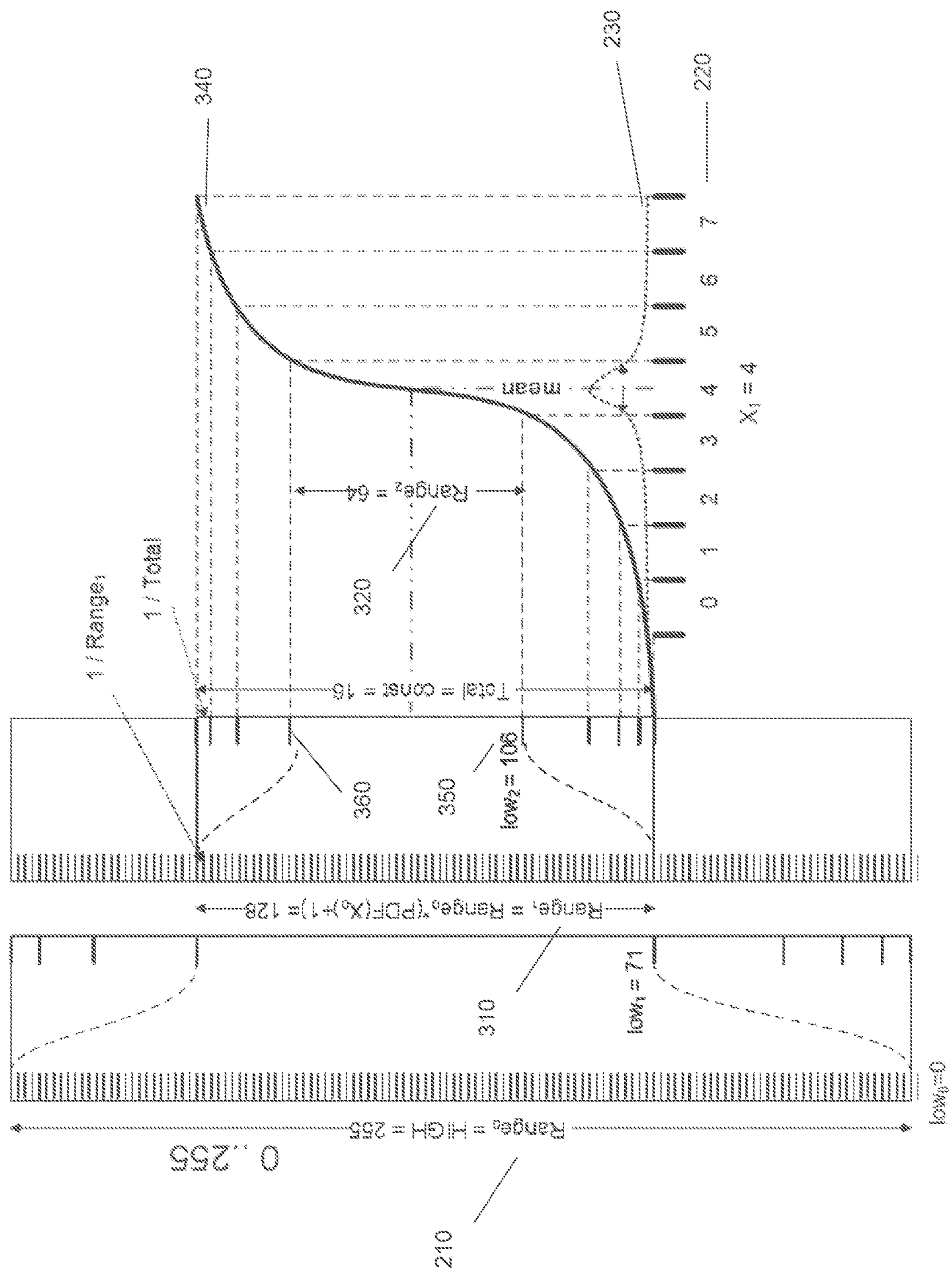
FIG. 3 is a schematic drawing of a second step of the arithmetic (range) coding of the message using the alphabet with eight symbols.

In FIG. 3, the cumulative distribution function CDF 340 is applied to $Range_1=128$ starting from $Low_1=71$ to map the symbols of the alphabet 220 onto the range. The next symbol of the message is "4". This results in a new current interval 350-360 that represents the message 44. This interval as shown in FIG. 7B has a new lower bound (current minimum) 720*b* $Low_2=106$=0110 1010.b and a new upper bound (current maximum) 710*b* $Low_2+Range_2=170$=1010 1010.b. The new $Range_2$ 320 equals 64.

Figure 4:
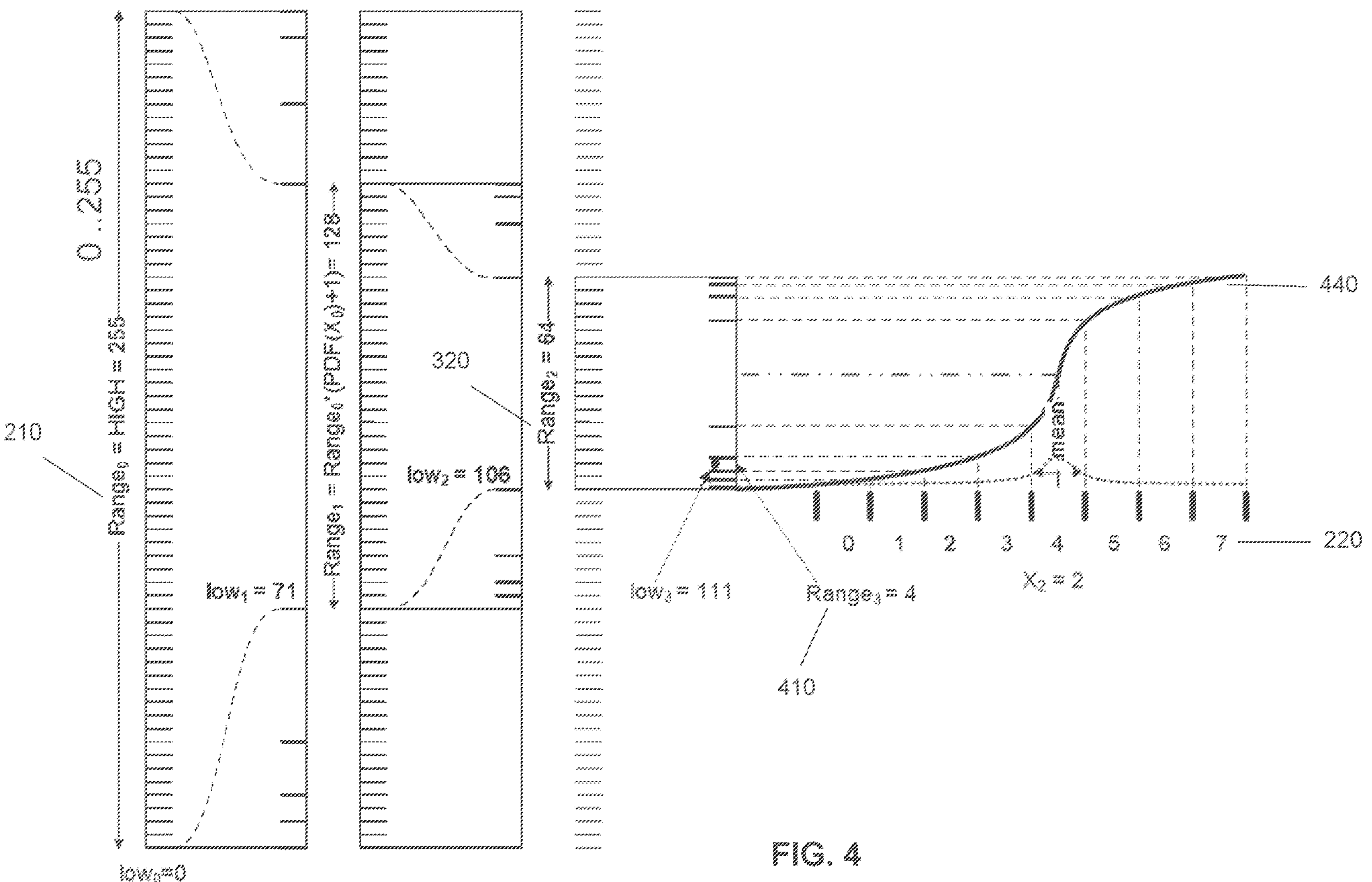
FIG. 4 is a schematic drawing of a third step of the arithmetic (range) coding of the message using the alphabet with eight symbols.

FIG. 4 and FIG. 7C show the next step of the encoding procedure. As $Range_2$ 320 is still greater than BOTTOM, this range is divided again according to the cumulative distribution function 440. This yields for the symbol 2 a low value 720*c* of $Low_3=111$=0110 1111.b and a $Range_3=4$ 410. Thus the message 442 is represented by the range from $Low_3$ to $Low_3+Range_3=115$=0111 0011.b 710*c*.

As the two bits 730 between HIGH and TOP positions are equal, they can be output into the stream 731 as coded bits, see FIG. 7D.

Figure 5:
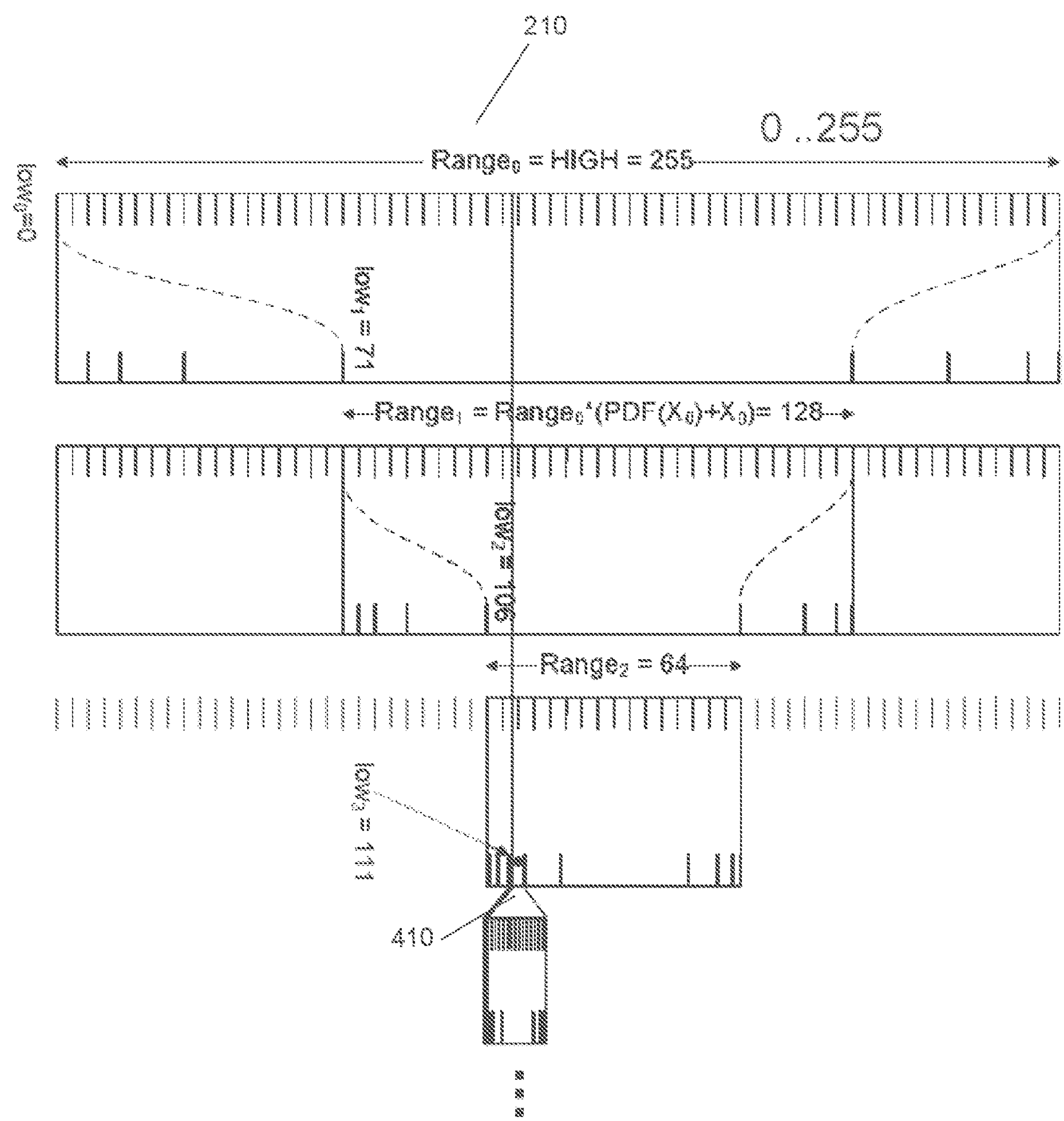
FIG. 5 is a schematic drawing of a fourth step of the arithmetic (range) coding of the message using the alphabet with eight symbols.

FIG. 5 illustrates that a proper mapping of the symbols onto the range is not possible as $Range_3=4$ 410 is smaller than BOTTOM=16 and thus a renormalization procedure is necessary. FIG. 7D shows that all bit representations are shifted left until a new $Range_4$ is greater or equal to BOTTOM. Thus one arrives at the new $Range_4=(4<<2)=16$ 610. The new upper bound 710*e* is obtained from the present one 710*d* after left shifting twice. The same shift is applied to $Low_3$ except for the two coded bits, which are already part of the stream $Low_4=188$=1011 1100.b 720*d*.

The message 442 is now encoded by any of the values between 444=01 1011 1100.b and 460=01 1100 1100.b.

Figure 6:
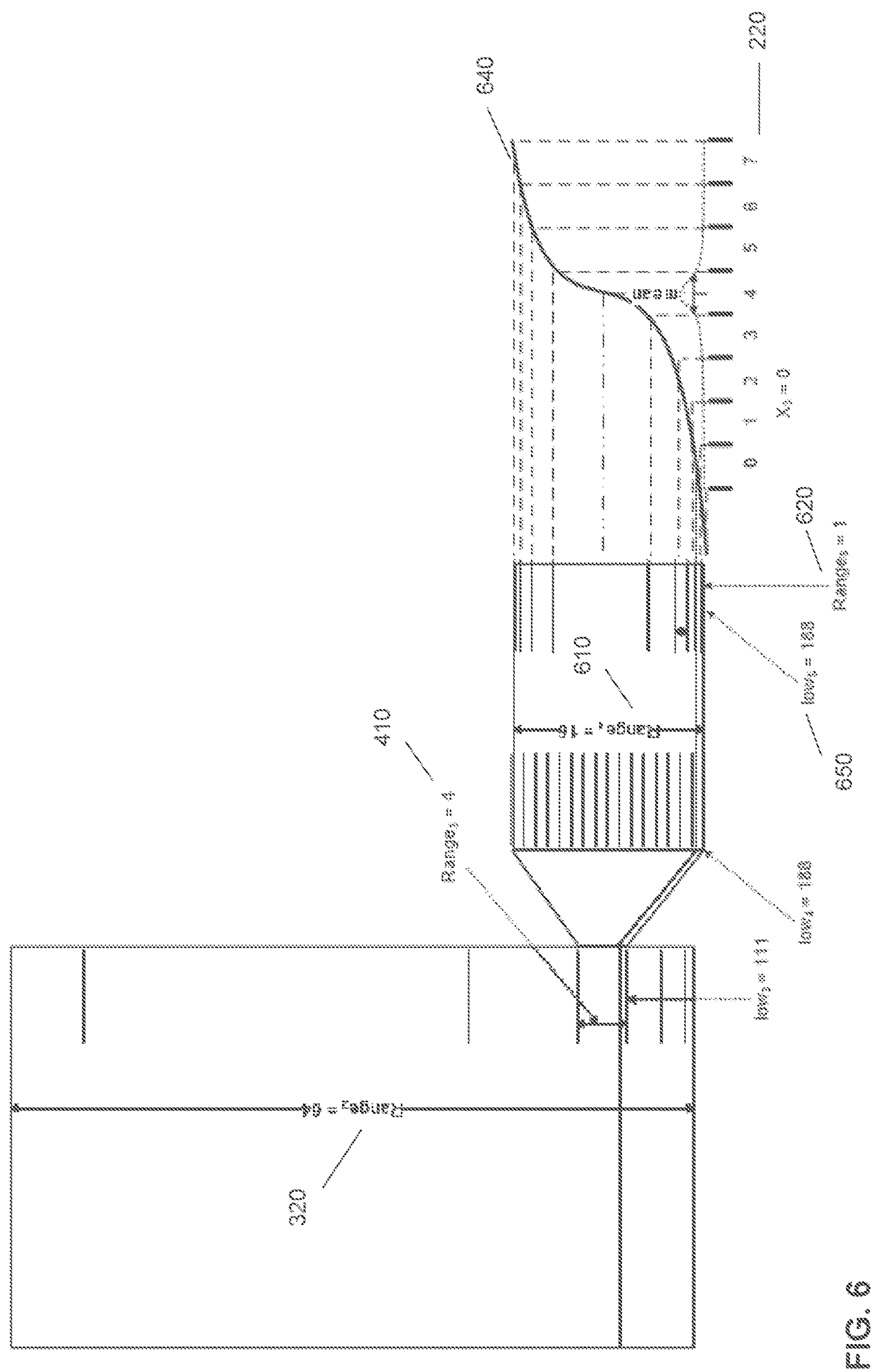
FIG. 6 is a schematic drawing of a final step of the arithmetic (range) coding of the message using the alphabet with eight symbols.

FIG. 6 shows the encoding of the last symbol "0". The probability distribution yields the lower value of the interval $Low_5=188$=1011 1100.b 650 and $Range_5=1$ 620. As there is no further symbol to be encoded, $Low_5$ and $Range_5$ describe the range interval of the trailing bits, which represent (together with the coded bits) the encoded message. In general, any value from an interval may be used (included into a bitstream) to represent the interval and thus also the coded message (sequence of symbols). Thus, the trailing bits can be chosen arbitrarily from this final range interval. In the present example, $Range_5=1$ 620 yields a single value for the trailing bits, namely $Low_5=188$=1011 1100.b 650. Thus, the message 4420 is encoded by appending the trailing bits to the coded bits, resulting in the coded value 444=01 1011 1100.b.

Arithmetic Decoding

Figure 8:
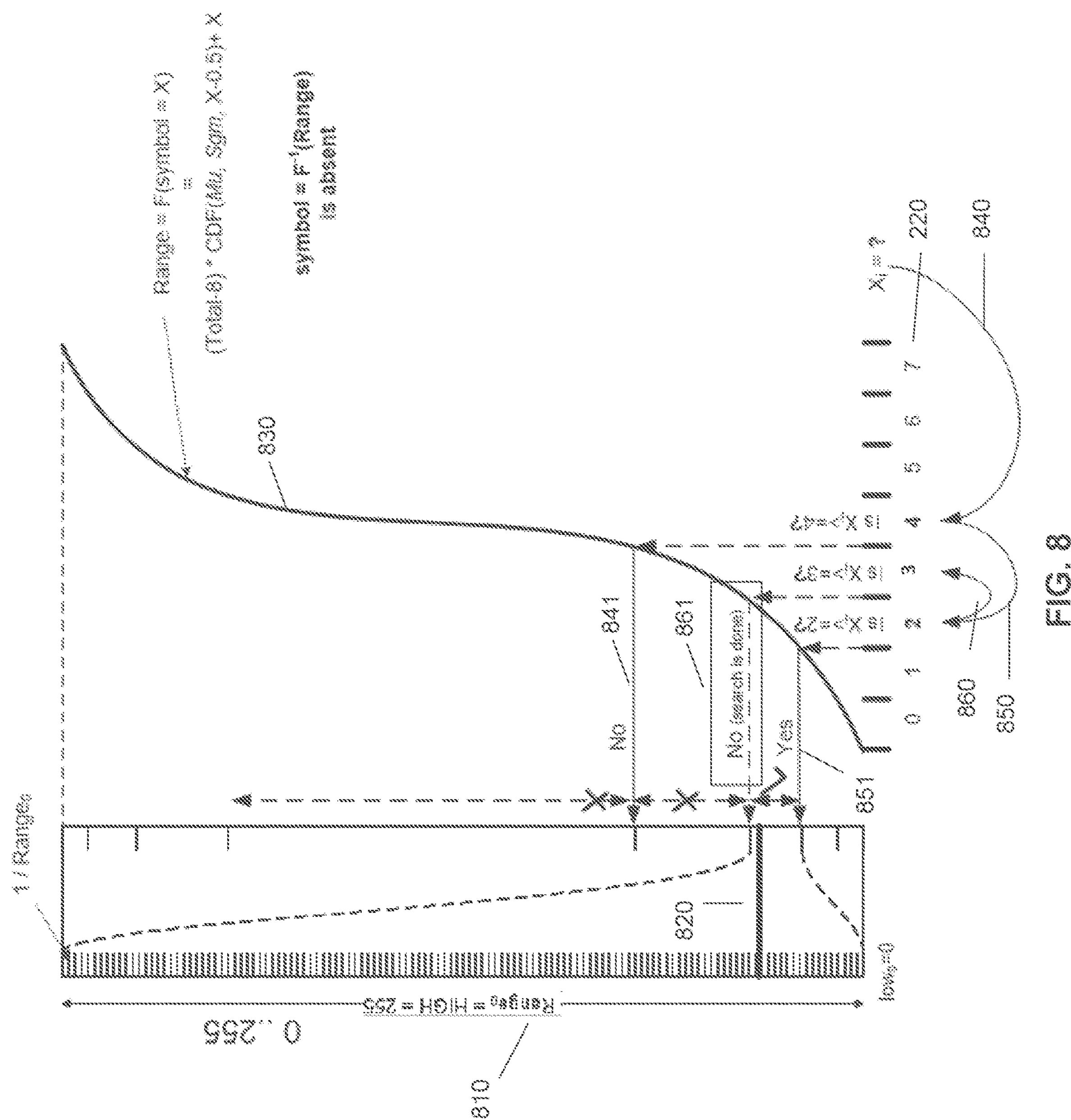
FIG. 8 is a schematic drawing illustrating an arithmetic decoding.

FIG. 8 depicts a decoding process. The decoder receives the coded values (bits) sequentially. The received coded value 820 is within the full $Range_0$=HIGH=255 810. The probability distribution function is known at the decoder side and thus the mapping of the symbols 220 onto the range by the cumulative distribution function 830. The decoder does not know an inverse of this mapping, thus the determination of the symbols requires a searching process. The decoder makes a first guess 840 for the encoded symbol by choosing the most likely symbol "4", calculates a Low value 841 of the range corresponding to this symbol and checks, if the received coded value 820 is higher than this Low value 841.

As the received coded value 820 is smaller than the Low value 841 of the first guess 840, the next guess 850 is a symbol, which is mapped onto lower values within the range, namely one of the symbols "0", "1", "2" or "3". Choosing a Low value approximately in the middle of the remaining interval of the symbols leads to a faster decoding process as less steps are required to obtain the correct symbol. In this example, the next Low value 851 that is chosen for comparison corresponds to the symbol "2".

The test for symbol "2" yields, that the received coded value is higher than the Low 851 of the range that encodes the symbol "2". Thus, the received coded value may represent the symbols "2" or "3". A final check 860 reveals that the Low value 861 of the range corresponding to "3" is higher than the coded value 820. So the received coded value 820 is decoded as symbol "2".

Entropy Coding of Multiple Channels

Figure 13:
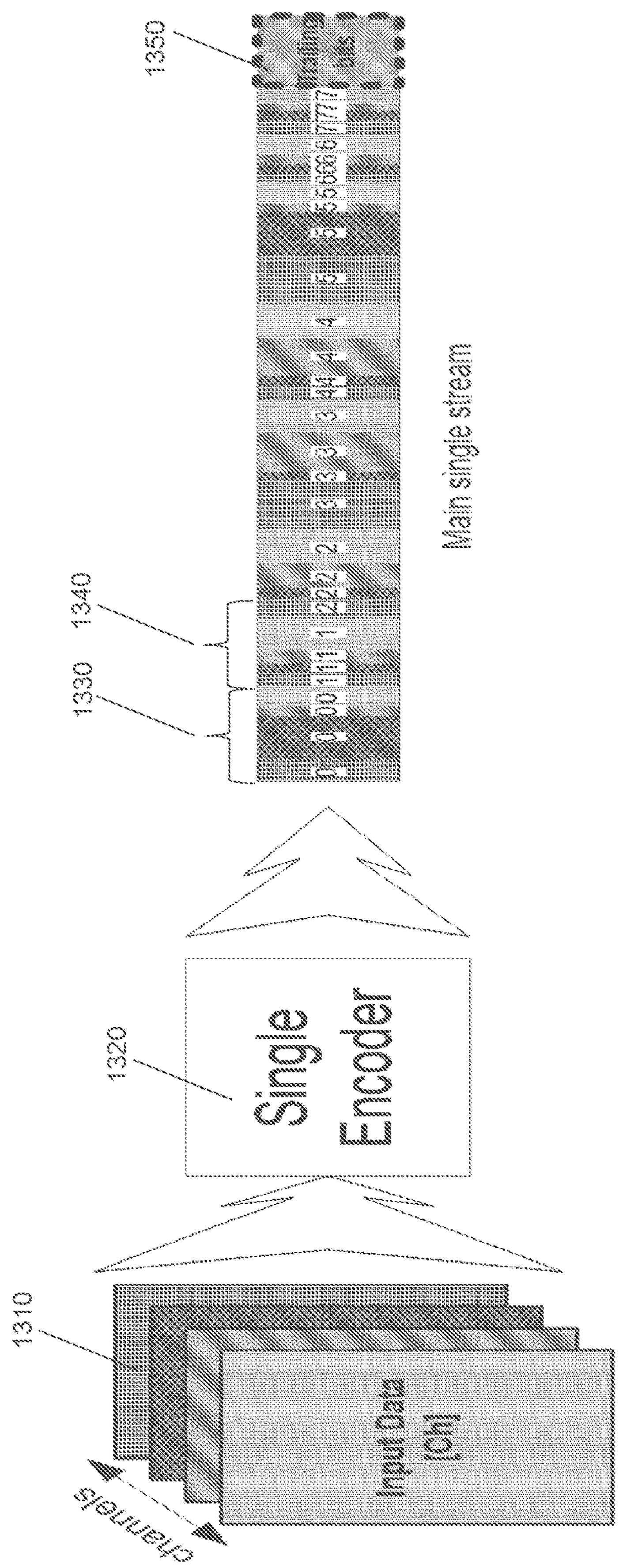
FIG. 13 is a schematic drawing of a single encoder encoding channels of input data into a single stream.

FIG. 13 shows a scheme of a single encoder 1320. Here the term "single encoder" refers to the fact that the encoder operates serially, i.e. encodes the input sequentially rather than in parallel. The input data may consist of or comprise multiple channels 1310. In this encoding process, portions of each of the channels are thus encoded sequentially. A portion of a first portion size from each of the channels 1330 is encoded (resulting in a multiplex of portions of the same, first size from different channels) followed by a portion of a second portion size from each of the channels 1340 resulting in a multiplex of portions of the same, second size from different channels). The trailing bits 1350, which remain in the encoder after the encoding of the last portion, are post-pended to the main single stream.

In a single (or single-core) entropy encoder there is only one finalization step at the end of the coding and the stream is padded by zero bits to make it byte aligned. There are no problems to signal few extra bits. However, it is difficult to parallelize such encoding and, correspondingly, also decoding.

Figure 14:
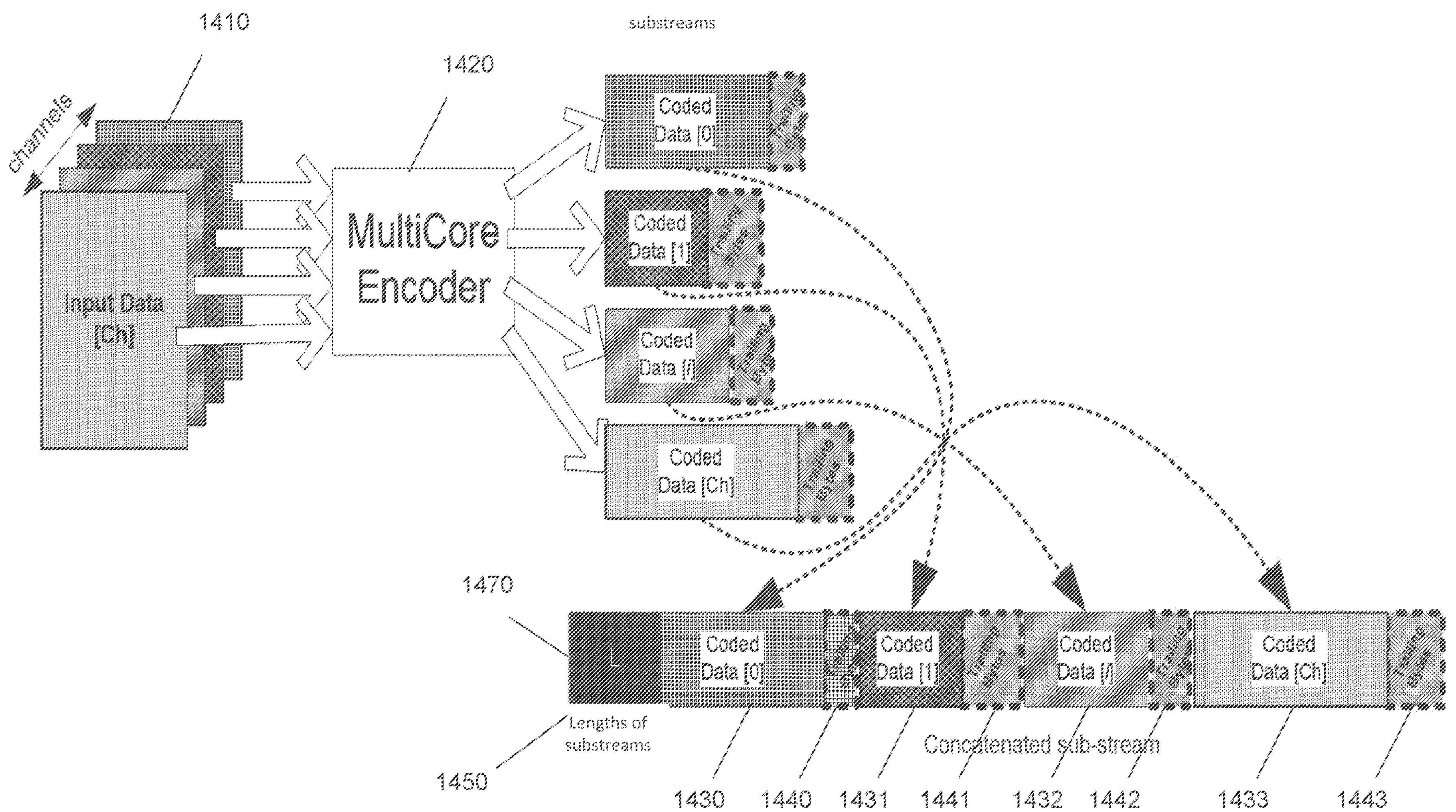
FIG. 14 is a schematic drawing of a multi-core encoder encoding channels of input data into substreams and concatenating the substreams into a bitstream.

FIG. 14 shows a scheme of a parallel (e.g. a multi-core) encoder 1420. Each of the input data channels 1410 may be encoded into an individual substream comprising coded bits 1430-1433 and trailing bits 1440-1443. The lengths for the substreams 1450 are signaled.

In parallel processing implementations, the bitstream consists of several substreams, which are concatenated in a final step. Each of the substreams needs to be finalized. This because the substreams are encoded independently of each other, so that the encoding (and thus also decoding) of one substream does not require previous encoding (or decoding) of another one or more substreams.

The finalization of an entropy encoding and, in particular, arithmetic encoding, may include encoding into the bitstream one or more of trailing bits and/or padding to the nearest byte boundary or to a boundary of a predefined amount of bits. However, when multiple substreams are encoded in parallel, the padding may result in the inclusion of a huge amount of meaningless padding bits. This problem may be solved if the number of trailing bits in each thread is not rounded to the nearest byte boundary, but the significant leading bits are determined among the trailing bits and their amount is specified within the bitstream.

Figure 15:
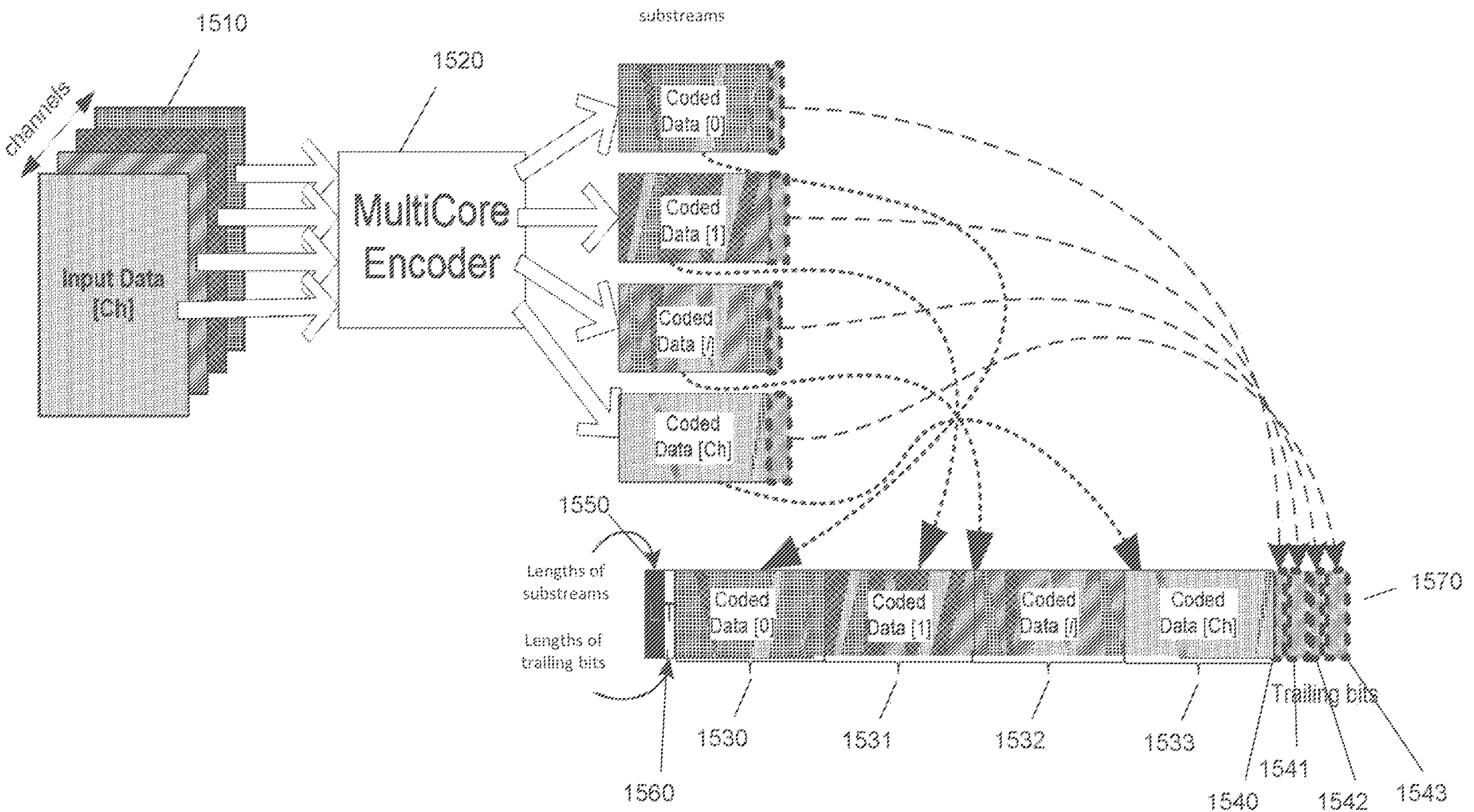
FIG. 15 is a schematic drawing of a multi-core encoder interleaving and encoding channels of input data into substreams and concatenating the substreams into a bitstream.

As shown in FIG. 15, where the trailing bits 1540-1543 are added to the bitstream 1570 directly following the coded data 1530-1533. The lengths of the trailing bits 1560 are included into the bitstream 1570, too. The multi-core encoder in this embodiment multiplexes and possibly shuffles portions of several input data channels 1510 before encoding the portions into a plurality of substreams.

It is noted that a complete portion multiplex for generating a substream does not have to be formed before encoding the substream. On the contrary, the entropy encoder may directly receive the portions-portion by portion—from the different channels and process them into the substream. The term of shuffling refers to the sequence (order) of portions within the multiplex (and consequently also within the substream after encoding the multiplex).

The input data channels may refer to channels obtained by processing some data by a neural network. For example, the input data may be feature channels such as output channels or latent representation channels of a neural network. In an implementation, the neural network is a deep neural network and/or a convolutional neural network or the like. The neural network may be trained to process pictures (still or moving). The processing may be for picture encoding and reconstruction or for computer vision such as object recognition, classification, segmentation, or the like. In general, the present disclosure is not limited to any particular kind of tasks or neural networks. While the present disclosure is readily applicable to encoding and decoding channels of neural networks, it is not limited to such applications. Rather, the present disclosure is applicable for encoding any kind of data coming from a plurality of channels, which are to be generally understood as any sources of data. Moreover, the channels may be provided by a pre-processing of source data.

Figure 18:
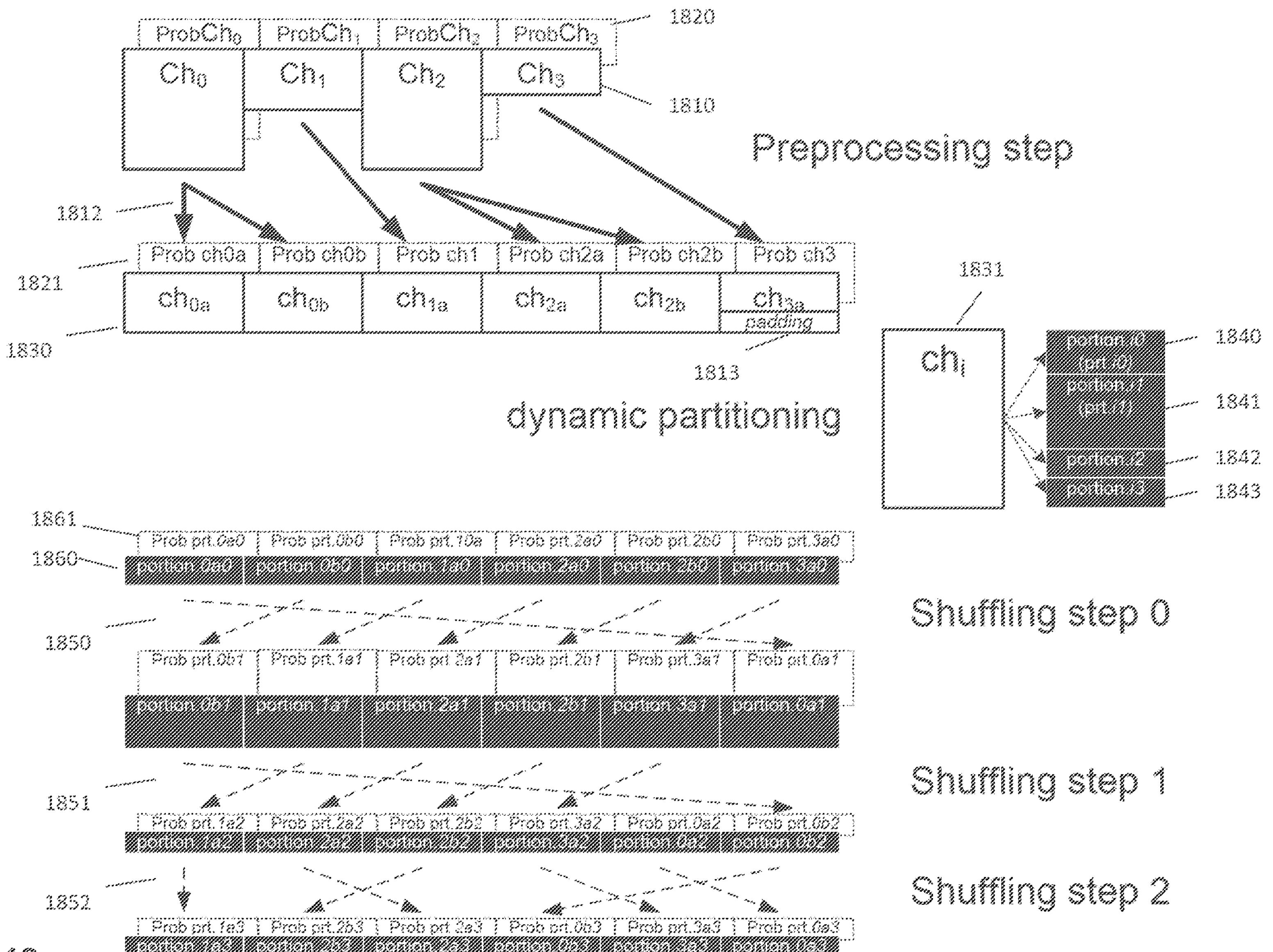
FIG. 18 is a schematic drawing of the preprocessing to obtain channels of the same size from input data and the shuffling process to form an interleaved and encoded substream.

FIG. 18 shows the pre-processing of input data channels 1810, denoted by Ch0, Ch1, Ch2, and Ch3, which have different sizes, together with their corresponding probability distributions 1820 (denoted as ProbCh0, ProbCh1, ProbCh2, and ProbCh3). The term size herein refers to number (amount) of bits, symbols or elements of the channels. While in general channels such as neural network channels, may have more dimensions such as vertical and horizontal, these do not typically play role in entropy coding which is performed serially (sequentially) for the channel elements. Depending on the entropy coding and the channel type, the encoding may be based (e.g. the probability model may be provided) for channel bits, channel symbols, or in general for channel elements. However, the present disclosure may also be applicable for splitting the channels into new channels of same size in more than one dimensions.

These input channels 1810 of different sizes are pre-processed to obtain channels of the same size 1830. Thus, the input channels that are larger than the required size may be split 1812. As can be seen in FIG. 18, for example, at least one of the channels (here two channels Ch1 and Ch2) is split into two channels (e.g. ch0*a* and ch0*b*, as well as ch2*a* and ch2*b*). The splitting may occur in any conceivable manner, e.g. a channel is divided into n (n being integer larger than continuous parts. Alternatively, the parts are not continuous but rather formed by assigning each symbol or each k symbols from the channel to one or the new channels repeatedly (interleaving the channel parts into the new channels).

The corresponding probability distributions of the channels Ch0 and Ch2, which are split, are adapted to the new channels ch0*a*, ch0*b*, ch2*a*, and ch2*b* of the same size. In other words, the new channels (e.g. ch0*a* and ch0*b*) may have distributions different from the distribution of the original channel (e.g. Ch0) from which they were deduced.

If a channel (e.g. Ch3) is smaller than said same size, it may be padded with zeros 1813 to result in new channels of the same size after splitting. Alternatively, the padding may be performed after splitting: e.g. if the last part of a split channel is smaller than the same size it may be padded with zeroes as shown in FIG. 18. However, the padding does not have to be done only in the last new channel, it can be inserted into more new channels, e.g. distributed between the new channels.

For example, the channel (such as Ch0 and Ch2) is to be split into n new channels, but may have a size, which is not divisible by n (e.g. in case of FIG. 18 not divisible by 2), In such case, it would not be possible to form n channels of the same sizes only with the data from the channel (Ch0 or Ch2). In order to overcome this issue, the channel or one or more of the n new channels may be padded. It is noted that there may be additional reasons for padding in some implementations. For example, the data from the channel (Ch0 or Ch2) may be split into the new channels (ch0*a*, ch0*b*, ch2*a*, and ch2*b*) not on a bit basis, but, e.g. on a basis of symbols such as bytes or symbols or other size. Then, the channel size in units of symbols rather than in unites of bits would need to be divisible by n.

Padding by zeros is merely one option. Padding may be performed by bits or symbols of any value. It may be padded by a repetition of the channel bits or symbols, or the like.

At the decoder side, the new channels will be decoded. In order to form the channels (e.g. Ch0 and Ch2) of different sizes, the padding shall be removed at the decoder side. In order to achieve this, the decoder needs information regarding these pre-processing steps. For instance, the decoder is configured to remove the padding based on its knowledge of the size of the channel(s) of the different sizes. E.g. the channel sizes may be defined by a standard or configured by side information or the like. The information regarding the pre-processing steps may also include the size of the new channels.

Following the pre-processing, each of the channels of the same size is divided into portions. In a first step, a portion of a first size 1840 is taken from each of the channels and these portions (possibly with the corresponded distributions) are multiplexed. This multiplex is entropy encoded into a first substream 1530. Furthermore, portions of a second size 1841 from the respective channels are multiplexed and subsequently encoded into a second substream 1531. The first size and the second size may be the same or may differ. The entropy encoding is performed separately for generating the first substream 1530 and for generating the second substream 1531. As mentioned above, the channel portions may be multiplexed together with a respective probability model side information. In an embodiment, such side information may correspond to a hyper prior obtained by a variational auto encoder with hyper prior subnetwork. However, there may be embodiments and implementations in which the probability model does not have to be provided as side information multiplexed together with the channel portions. For instance, the probability model may be updated in a context adaptive manner based on the previously encoded and/or decoded data, or the like.

The multiplexing and encoding of portions from different channels instead of encoding each channel separately, provides the possibility to yield completed substreams faster and/or to control the lengths of individual substreams, e.g. to obtain more uniform lengths of substreams. This opens the possibility to perform the entropy encoding and/or the entropy decoding in parallel for a plurality of substreams.

The present disclosure is not limited to providing only portions of the same size or portions of a first size and a second size different from the first size. In addition, there may be included portions of other sizes, e.g. of a third size 1842 and/or a fourth size 1843, into the first substream or the second substream. This third size may be equal to the first size or to the second size. This is illustrated in FIG. 18 where an i-th channel $ch_i$ is divided into four portions portion.i0, portion.i1, portion.i2, and portion.i3. By dividing all channels in the portions of the same size and then forming substreams including portions from different channels, the substream size may be controlled. This may be referred to as dynamic partitioning.

For example, the individual substreams can be extended in their length by including more portions, and still can be adjusted to a desired length. Even though the multiplex of the portions to form the first substream and the second substream may have the same size, after the entropy encoding the first substream and the second substream may have different sizes. Thus, it may be desirable to adapt the substream sizes to reduce their variance, e.g. by configuring the size and/or the number of portions to be included into the multiplex. For example, if there are less individual substreams, which are longer, there need to be signaled less length indications or less padding is required.

The entropy encoding may be an arithmetic encoding or a range encoding. In these cases, the encoding results in coded bits 1530-1533 and (if present) trailing bits 1540-1543. These trailing bits are the status of the encoder after the encoding of the last portion. It is noted that the present disclosure is not limited to embedding separately, in the bitstream, the coded bits and the trailing bits. There may be encoders which output all bits into the bitstream as coded bits. The present substream based on independent encoding and decoding is applicable to such encoders and decoders as well.

The substreams are multiplexed into the bitstream 1570 together with substream length indications 1550 that indicate the length of the respective substreams.

In an embodiment (as shown in FIG. 15), the substream length indications 1550 precede their respective substreams within the bitstream 1570. In addition, the second substream length indication may also precede the first substream 1530, i.e. a plurality of substream length indications are concatenated and included into the bitstream 1570 before the plurality of substreams. The plurality of substreams may be some or all of the substreams generated from the channels, e.g. pertaining to one picture or a picture portion or a predetermined number of pictures or another container of channel data. How many substreams are included in the plurality may be also configurable or fixed to a predefined number which may, but does not have to correspond to the number of channels of the same size.

In addition, the trailing bits may be signalled together with a length indication. There are trailing bits for each substream, namely first trailing bits and second trailing bits. Thus, a first trailing bits length indication and a second trailing bits length indication may be included into the bitstream 1570. The trailing bits length indications 1560 may precede their respective substreams within the bitstream 1570. The second trailing bits length indication may also precede the first substream 1530. Thus, the concatenated trailing bits length indications 1560 precede the first substream 1530. The order of the substream length indication(s) and trailing bit length indications is to be predefined so that both encoder and decoder are capable of forming and parsing the bitstream compliantly.

Including all these length indications into the bitstream avoids the padding of individual substreams and/or trailing bits. In particular, in some implementations, padding may be performed after the plurality of substreams and the corresponding indications have been included into the bitstream. However, the present disclosure does not require padding, as there may be bitstream structures or protocols which would not require such alignment to a particular raster of bits or symbols.

Alternatively to concentrating the indications for multiple substreams, in an embodiment, the trailing bits of the first substream 1540 may be included into the bitstream following the first substream 1530, and the trailing bits of the second substream 1541 may follow the second substream 1531 within the bitstream 1570. Advantage of this bitstream structure may be the possibility of immediate encoding or decoding of the substream without need to buffer a plurality of substreams and the respective indications. Further, the first trailing bits 1540 may follow the second substream 1531.

The bitstream 1570 constructed as in any of the embodiments above might padded as to align the bitstream length to match an integer multiple of a predetermined amount of bits such as bytes, words or doublewords or the like. Such an approach may provide a bitstream e.g. appropriately aligned for further processing such as encapsulation into network adaption layer units or other packets.

The data of the plurality of channels 1510 consists of symbols, which are, for example, bits. All portions included into the first substream 1530 and all portions included into the second substream 1531 may be an integer multiple, K, of these symbols, K being larger than 1.

The portions may be shuffled in order to achieve more uniform distribution of substream sizes. Shuffling has been already mentioned with reference to FIG. 18. It corresponds to interleaving of portions which is performed synchronously on encoding and decoding side, i.e. using the same rules at the encoding and decoding sides to ensure compliancy between the encoding and decoding. The shuffling method is selected out of a set of predefined methods and subsequently applied to specify the order of the portions of the first size and of the portions of the second size. The portions 1860 (e.g. portion 0a0, portion 0b0, portion 1a0, portion 2a0, portion 2b0 and portion 3a0) are shuffled synchronously. The scheme in FIG. 18 shows a cyclic permutation 1850 of the portions. Moreover, the corresponding probability distributions 1861 (e.g. Prob prt.0a0, Prob prt.0b0, Prob prt.1a0, Prob prt.2a0, Prob prt.2b0 and Prob prt.3a0) associated with the respective portions are to be applied for the entropy coding (e.g. arithmetic coding). Thus, the portions and the associated probability portions (models) can be seen as shuffled synchronously.

The shuffling (and possibly the shuffling method selection) may be performed repeatedly over portions to be encoded to reduce differences in length between the encoded first substream and the encoded second substream—in general between the substreams over time. Therefore, the shuffling method may take into account the difference between the length of a current (e.g. first or second) substream and a statistic value based on lengths of past substreams, and/or the difference between the length of the current substream and a statistic value based on lengths of past substreams. Such a shuffling method may result in any arbitrary shuffling 1852 of the portions, i.e. in any possible reordering.

This may include collecting statistic measures of past substreams in order to obtain a distribution of lengths of past substreams. This distribution may be obtained and used on encoder and decoder side simultaneously, as both sides have previously processed the same substreams.

The statistic value may be based, for example, on the estimated mean, median, minimum or maximum values of the lengths of past and/or current substreams, or the speed of growing of the lengths of the substreams, or speed of decreasing the lengths of the substreams, or a combination thereof, or another statistic measures (estimators).

If the entropy encoding is an arithmetic encoding, the shuffling method may also take into account the current state of the range interval in the arithmetic encoding process.

The current state of the range interval may also provide detail information of substream length and could be taken into account for an estimation of the speed of growth of the substreams based on a particular channel. In particular, when the current state of the range interval is small, it is an indication that the substream length is larger and vice versa. Based on such an estimation of growth, an appropriate shuffling method can be selected.

As mentioned above, an appropriate shuffling may provide some advantages as is illustrated in the following example. Let us assume here that the shuffling may be a circular rotation (cyclic permutation) of the channels. In this example, let us have three channels Ch1, Ch2, and Ch3, with different respective speed of growing substream sizes (also referred to here as lengths): a substream grows by 10 bytes per portion from Ch1, by 2 bytes per portion from Ch2, and by 20 bytes per portion from Ch3. Thus, after encoding first three portions in parallel into the substreams S1, S2, and S3 and without shuffling, the following stream lengths are achieved:

1$^{st}$ portion from each channel is encoded without shuffling in the order of Ch1, Ch2, and Ch3. This results in the three respective parallel stream sizes of 10, 2, and 20 bytes for the respective S1, S2, and S3.

If a second portion is encoded without shuffling, in the same order of Ch1, Ch2, and Ch3, the parallel stream sizes of 20, 4, and 40 bytes are achieved after including the second portion from each of the three channels.

If a third portion is encoded without shuffling, in the same order of Ch1, Ch2, and Ch3, the parallel stream sizes of 30, 6, and 60 are obtained after including the third portion from each of the three channels.

As can be seen in this example, the parallel substreams differ substantially in length. This may be undesirable for some applications. In order to improve this situation, shuffling may be performed. In particular, the order in which the portions are taken from each channel may be changed.

One may assume the same channels Ch1, Ch2, and Ch3 as mentioned above with the same growth speeds. In case a shuffling by circular shifting of the channel order Ch1, Ch2, Ch3 is performed, the following results are obtained:

1$^{st}$ portion is taken here from the three channels in the same order as in the above example. Namely, the order is Ch1, Ch2, and Ch3. This results in the same parallel stream sizes of 10, 2, and 20 bytes.

2$^{nd}$ portion is taken in a shuffled order, in particular in a circularly shifted order (shift right by one): Ch3, Ch1, and Ch2. This results in the respective stream sizes of 30, 12, and 22 bytes. These stream sizes are obtained by adding to the streams of lengths 10, 2, and 20 bytes from the previous step the sizes of 20, 10, and 2 corresponding to the shuffled channels. As can be seen, after the 2$^{nd}$ portion, the sizes after shuffling 30, 12, and 22 exhibit lower variance than the sizes from the previous example without shuffling 20, 4, and 40 bytes.

3$^{rd}$ portion is taken in an order shuffled again, in this example by repeated cyclic shift right, resulting in the order of channels Ch2, Ch3, and Ch1. The resulting stream size of the three parallel streams is 32, 32, and 32. This size results from adding to the stream sizes 30, 12, and 22 bytes of the preceding step (of 2$^{nd}$ portion adding) further respective 2, 20 and 10 bytes. As can be seen, after the second shuffling, the length of the parallel streams (corresponding to the substreams described above) is equalized.

In practical applications, the growth may not be so easily and accurately estimatable. In particular, it is not necessarily stationary as in the above example. Nevertheless, the shuffling may improve the equalization of the substream lengths (sizes). In order to do so, an estimation of the speed of growth may contribute to the performance. As described above, the growth of the (encoded) substream may be estimated based on previously coded (decoded) portions or substreams. However, an even closer indication may be provided by the current state of the range interval. If the range interval is large, it is indicated that the length of the substream is lower and there is less contribution to the speed of growth. If the range interval is small, a larger length of the substream is indicated, which corresponds to a larger contribution to the speed of growth. In other words, the length of the range interval is inverse proportional to speed of growth of the stream. The proportionality is not necessarily linear.

During the encoding and decoding, a shuffling mechanism may therefore be applied. Shuffling may be similar as described above, for instance, after encoding (or decoding) a k-th portion from each channel in a k-th order of channels, a (k+1)-th portion from each channel is encoded in a (k−1)-th order of channels. In an implementation, the (k+1)-th order is obtained from the k-th order by cyclically shifting the k-th order. The cyclical shift may be right or left. It may be advantageous if the shift is by 1 channel. However, the present disclosure is not limited thereto and the shift step may differ from 1. As already mentioned above, the shuffling order may be also selected and signaled.

In another embodiment, the portion of a channel, which is encoded into a substream with larger length and higher speed of growth, may be exchanged, i.e., shuffled, with a portion of a channel, which is encoded into a substream with lower length and lower speed of growth. In particular, the method may determine the lengths of the substreams and the speed of growing of the lengths of the substreams. Based on the result of this determination the method shuffles the portions. In terms of the example above, this corresponds to an exchange of channel Ch2 and channel Ch3. This exchange encodes portions from Ch3 contributing to the larger speed of growth (20 bytes per portion) to the substream S2 of smaller length. Portions from Ch2 contributing to the smaller speed of growth (5 bytes per portion) are encoded to the substream S3 of larger length. This leads to an increased growth of S2 and a reduced growth of S3. Thus the above mentioned differences in length between the encoded substreams may be reduced. In practical applications, the growth may not be necessarily stationary as in the above example.

The entropy encoding into the first 1530 and the second substream 1531 may be performed in parallel, for example by one of the multi-core encoders 1420, 1520 in FIGS. 14 and 15. In some implementations, only parts of the entropy encoding may be performed in parallel.

The decoding method involves entropy decoding of a first substream 1530 and a second substream 1531 into multiplexed portions. The entropy decoding may be performed separately for the first and the second substream. The plurality of channels 1810 may be obtained from demultiplexing portions of a first size 1840 and portions of a second size 1841. The first size and the second size may be the same. The channels of the same size 1620 may be post-processed to obtain a plurality of channels of different sizes 1810. This post-processing involves adding (concatenating)

channels that have been split. Channels that have been padded with zeroes are clipped in order to obtain the input data, i.e. the padding is removed. Information regarding these steps may be included in the channels of the same size. The channels of any size may be output channels or latent representation channels of a neural network.

The entropy decoding may be an arithmetic decoding or a range decoding, e.g. as described in the section Arithmetic encoding above. However, the present disclosure with regard to forming of the substreams is not limited to application of arithmetic encoders and decoders. Rather, any entropy coding and/or run length coding or the like may be applied to the channel data. The entropy coding may be context adaptive. These embodiments correspond to the above described encoding examples.

The substreams are extracted from the bitstream 1570 together with a first substream length indication indicating length of the first substream, and a second substream length indication indicating length of the second substream. For instance, the substreams may be extracted when the length indications of the substreams are known before the extraction.

Thus, the substream length indications 1550 may precede their respective substreams within the bitstream 1570. In addition, the second substream length indication may also precede the first substream 1530.

By signaling concatenated length indications before the substreams, the decoder may extract substreams simultaneously.

A first trailing bits length indication indicating length of the first trailing bits and a second trailing bits length indication indicating length of the second trailing bits may be extracted from the bitstream 1570. The trailing bits length indications 1560 may precede their respective substreams within the bitstream 1570. The second trailing bits length indication may also precede the first substream 1530.

The trailing bits of the first substream 1540 may be included into the bitstream following the first substream 1530 and the trailing bits of the second substream 1541 may follow the second substream 1531 within the bitstream 1570. Further, the first trailing bits 1540 may follow the second substream 1531.

The data of the plurality of channels 1510 consists of symbols, which may be bits. All portions decoded and demultiplexed from the first substream 1530 and all portions decoded and demultiplexed from the second substream 1531 may be an integer multiple, K, of these symbols, K being larger than 1.

After the extraction of the first substream length indication, the second substream length indication, the first trailing bits length indication, the second trailing bits length indication, first substream 1530, the second substream 1531, the first trailing bits 1541 and the second trailing bits 1541, there may be remaining bits. Bits that are left in the bitstream 1570 after the extraction of the last trailing bits are the result of padding the entire bitstream 1570 to match an integer of a predetermined number of bits in order to provide a bitstream e.g. appropriately aligned for further processing such as encapsulation into network adaption layer units or other packets. The remaining bits can be discarded.

During the multiplexing of portions in the encoding process, there may have been applied a shuffling method. For example, this method is signaled within a control information included in the bitstream. Thus the decoder may parse a shuffling method indication from the bitstream. The indication may be, e.g. an index to a list of shuffling methods which may be defined by a standard or configurable according to a standard and signalable in the bitstream, possibly less frequently than the shuffling method indications themselves.

Thus, the shuffling method can be determined from a set of predefined shuffling methods and applied for the demultiplexing of the portions of the first size 1840 and the portions of the second size 1841. The shuffling method specifies the order of the portions within the substream. In addition, the shuffling method may also define the lengths of the portions of the substream in the implementations, in which the portion length may vary. In some embodiments, the portion length may be same across the channels and/or across the substreams.

The entropy decoding may be performed in parallel, for example by a multi-core decoder. In addition, only parts of the entropy decoding may be performed in parallel.

Handling of Trailing Bits

Figure 9:
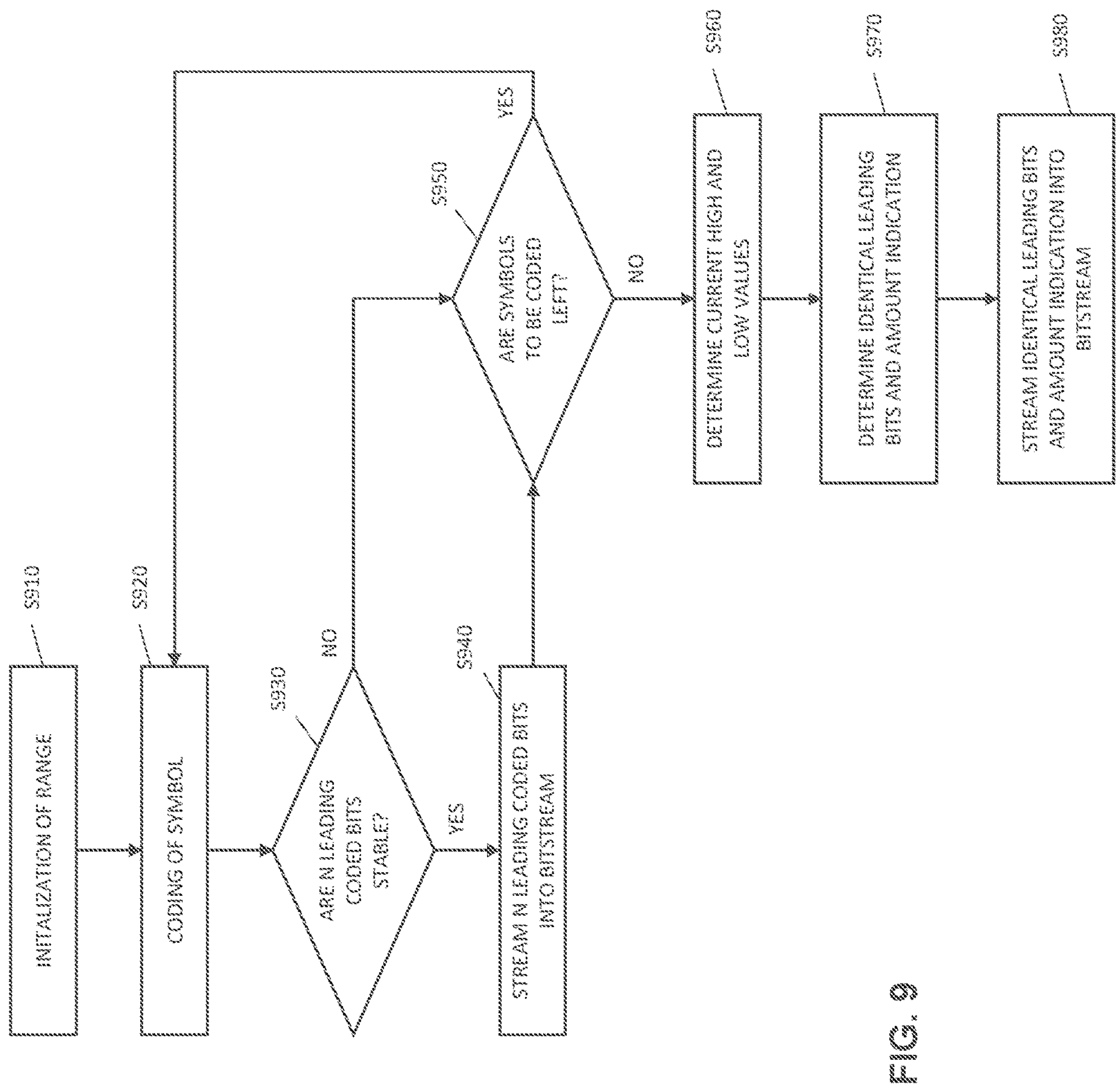
FIG. 9 is a flow diagram illustrating an encoding method.

FIG. 9 is a flow diagram illustrating a method for arithmetic coding of input data into a bitstream 1750. An example for an encoded bitstream 1750 is given in FIG. 17.

The method may initialize the initial range S910 used by the encoder. For example, such initial range may correspond to the initial range 210 in FIG. 2, as discussed above. The encoding starts with the first symbol of the message to be encoded and proceeds over all symbols of the message to obtain the coded bits.

In step S920, a current symbol from the message is coded with an arithmetic code, for instance as described with reference to FIGS. 2 to 7D.

After the coding loop S920-S950, coded bits are included in the bitstream 1570. However, there are still trailing bits remaining in the register, which indicate the status of the encoder. The interval describing the trailing bits is the current range that remains after encoding the last symbol and streaming the coded bits 1730-1731. The trailing bits, which form together with the coded bits 1730-1731 the arithmetically coded data, can in general be chosen arbitrarily from this interval.

However, the trailing bits may be chosen in such a way to maximize the amount of trailing zeroes within the leading trailing bits. These trailing zeroes may not be included into the bitstream 1750 and thus can be clipped.

The determined minimum and maximum value S960 of this interval may contain an amount of Most Significant Bits, MSBs, which are identical. These identical leading bits are consecutive trailing bits, i.e. they form a set of successive trailing bits. The amount of these leading trailing bits 1740-1741 can be determined S970.

These identical leading bits and an indication of the determined amount of the leading trailing bits can be included into the bitstream S980.

The amount of the leading trailing bits, NumTrailingBits, is determined by:

$$\text{NumTrailingBits}=\text{CLZ}((\text{LOW}+\text{RANGE}-1)\,\text{XOR}\,\text{LOW}),$$

where CLZ( ) is count of leading zeros, LOW is the minimum value of the interval and, RANGE is the range of the interval. XOR denoted the operation of exclusive logical OR.

Figure 16:
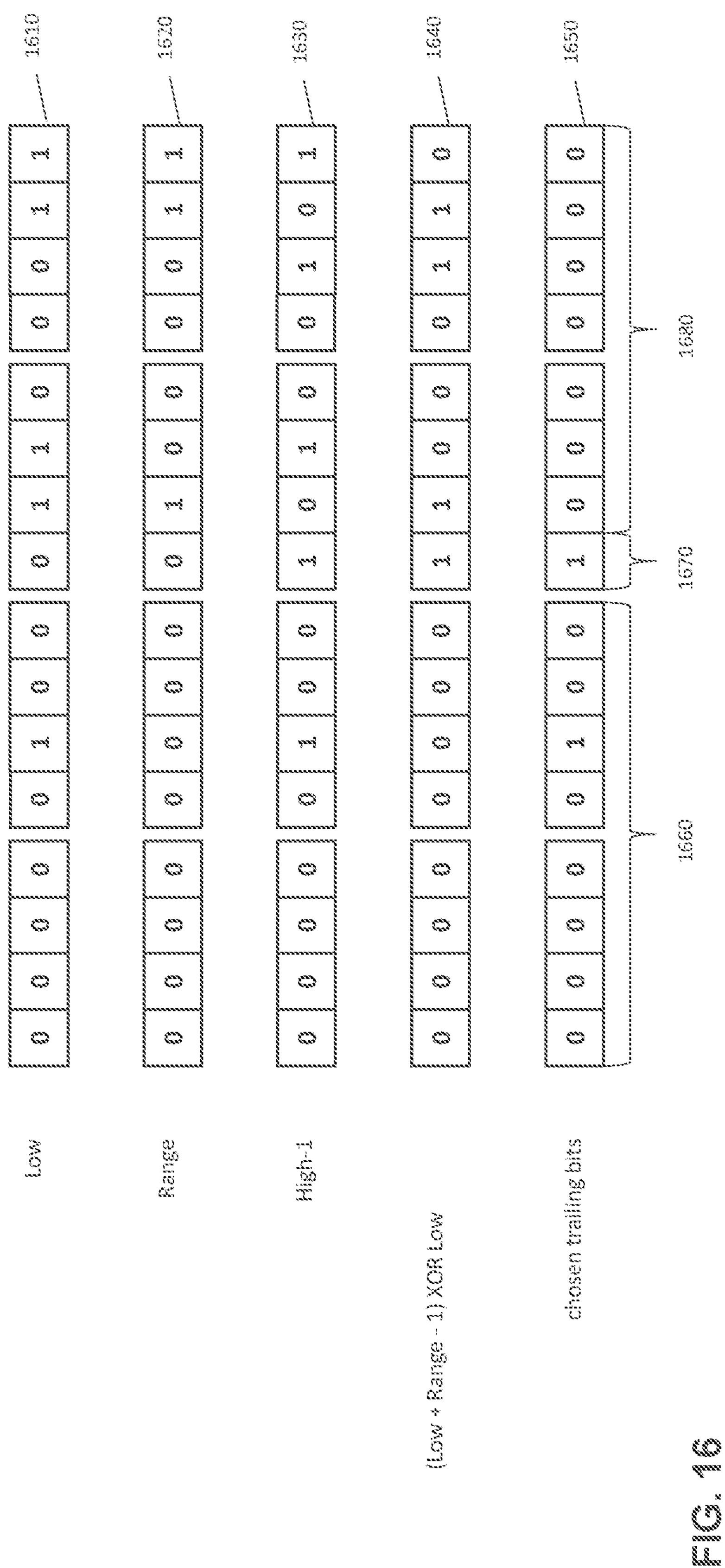
FIG. 16 is a schematic drawing illustrating the determination of the identical leading trailing bits.

An example for the determination of the identical leading bits 1740-1741 and their amount is illustrated in FIG. 16. After encoding the last symbol and including the coded bits 1730-1731 into the bitstream 1750, there are 16 trailing bits remaining within the encoder. The trailing bits are represented by the current minimum 1610 Low=1123 and the range of the current interval 1620, Range=67.

In FIG. 16, these values are given in binary representation. The current maximum value 1630 High-1=(Low+Range−1)=(1123+67−1) is determined from the current minimum 1610 and the current range 1620.

(High−1) XOR Low 1640 yields a zero bit in a position where the bits in LOW 1610 and HIGH−1 1630 are identical and a bit one otherwise.

The leading zeroes within this value 1640 indicate the identical leading bits within the trailing bits. Thus the count of leading zeros CLZ( ) leads to CLZ((low+range−1) XOR low)=8.

In this example, there are 8 identical leading bits. The trailing bits 1650 within the current interval are chosen as the value between Low and High−1 by zeroing all bits after the first bit that is different in Low and High−1, thus arriving at 0b.0000.0100.1000.0000 1650.

As mentioned above, the trailing zeroes 1680 can be clipped together with the bit one 1670 that first bit being different in Low and High−1, because this bit is always one and does not need to be signaled. Thus, the leading trailing bits 1660 in this example are formed by the 8 bits 0000 0100.

The determined number of leading zeroes is included in the indication of the amount of leading bits. This indication precedes 1720 the coded bits 1730-1731 and the leading trailing bits 1740-1741 within the bitstream 1750.

However, the leading trailing bits 1740-1741 may be included into the bitstream 1570 together with the bit with value one 1670, which is added immediately following the leading trailing bits 1660. This postpended bit is the first bit that is different in Low and High−1. The indication of the amount of leading trailing bits 1720 includes the additional bit one in this case.

Figure 17:
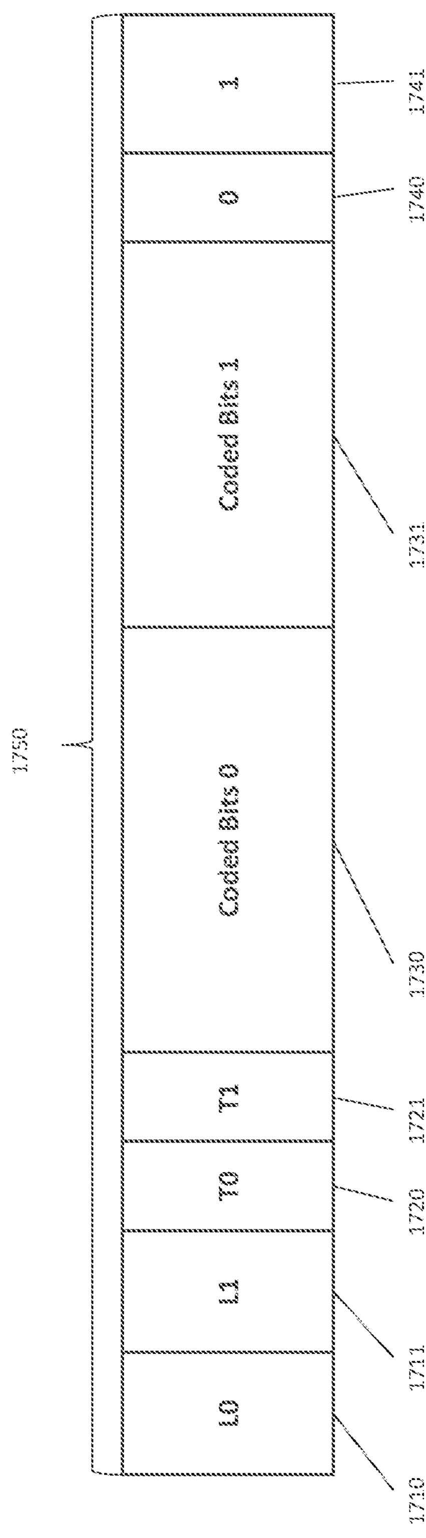
FIG. 17 is a schematic drawing of the bitstream including length indications, coded bits and leading trailing bits.

The method for arithmetic coding may be performed on multiple substreams separately. An embodiment is given in FIG. 14. There the method as described above is applied to a first substream and a second substream resulting in first coded bits 1430*a*, second coded bits 1431, first leading trailing bits 1440*a* and second leading trailing bits 1441. A bitstream 1750 is formed out of these pieces as schematically illustrated in FIG. 17 by inserting the first coded bits 1730 and the second coded bits 1731 followed by the first leading trailing bits 1740 and the second leading trailing bits 1741 into the bitstream 1750. The first leading trailing bits 1740 follow the second coded 1731 bits directly, there is no padding required.

The bitstream 1750, which is formed from the first and the second substream, may also include length indications for the first 1710 and the second coded bits 1711. These first and second length indications 1710-1711 may precede the respective coded bits 1730-1731 within the bitstream 1750.

In addition, the second length indication 1711 may precede also the first coded bits 1730. This is shown in FIG. 17. The length indications 1710-1711 are concatenated for each of the coded bits 1730-1731 and are included into the bitstream before the coded bits 1730-1731.

The indication of the amount of the second leading trailing bits 1721 may precede the first coded bits 1730 within the bitstream 1750. The example in FIG. 17 includes the concatenated indications 1720-1721 followed directly by the first coded bits 1730-1731.

The bitstream 1750 joined together as in any of the embodiments above might be padded as to align the bitstream length to match an integer multiple of a predetermined amount of bytes, for example, this may be words or doublewords.

The arithmetic encoding of the first and the second substream may be performed in parallel, for example by one of the multi-core encoders 1420, 1520 in FIGS. 14 and 15. In some implementations, only parts of the arithmetic encoding may be performed in parallel.

As mentioned above the method of arithmetic encoding may be realized as a range coding. This range coding may have predefined total range; the preconfigured size of the memory is equal to or greater than the number of bits representing the total range (log_2 of the total range).

The memory may hold the minimum and the maximum value of the current range interval. For example, such minimum value in a finite register may correspond to the binary representation 720*c* in FIGS. 7A-D, and such maximum value in a finite register may have the binary representation 710*c*. After one or more iterations of the encoding loop, there may be stable bits, which are consecutive bits that have the same value in MSBs of the binary representation of the current minimum value and the current maximum value. A predetermined amount of these stable bits is moved out of the memory into the bitstream. This corresponds, for example, to the two bits between the HIGH and the TOP position in FIG. 7A-D. In an implementation there may be 16 bits between the HIGH and the TOP position. The present invention is not limited to any of these examples.

It may happen that the difference between the amount of leading trailing bits and the predefined amount of bits out of stable bits between the HIGH and the TOP position is below a predefined threshold, e.g. there may be 16 bits between the HIGH and the TOP position and 15 leading trailing bits. In this case, it is more efficient to include the leading trailing bits into the coded bits. Therefore, trailing coded bits are generated from the leading trailing bits. A bit one 1670 has to be added to the leading trailing bits 1660 and the bits may be padded with zeroes to reach the predefined number of stable bits. Thus, the expensive signaling of many leading trailing bits together with the indication of the amount of trailing bits is avoided. For example, to signal the amount of 15 leading trailing bits at least 4 bits are necessary. Instead it may be cheaper to have more coded bits and signal zero leading trailing bits. They may be encoded efficiently, e.g. in case of frequent occurrence.

The above mentioned predefined threshold may be determined empirically, e.g. taking into account the amount of bits between the HIGH and the TOP position and the amount of signaling used to indicate the length of the leading trailing bits.

Figure 10:
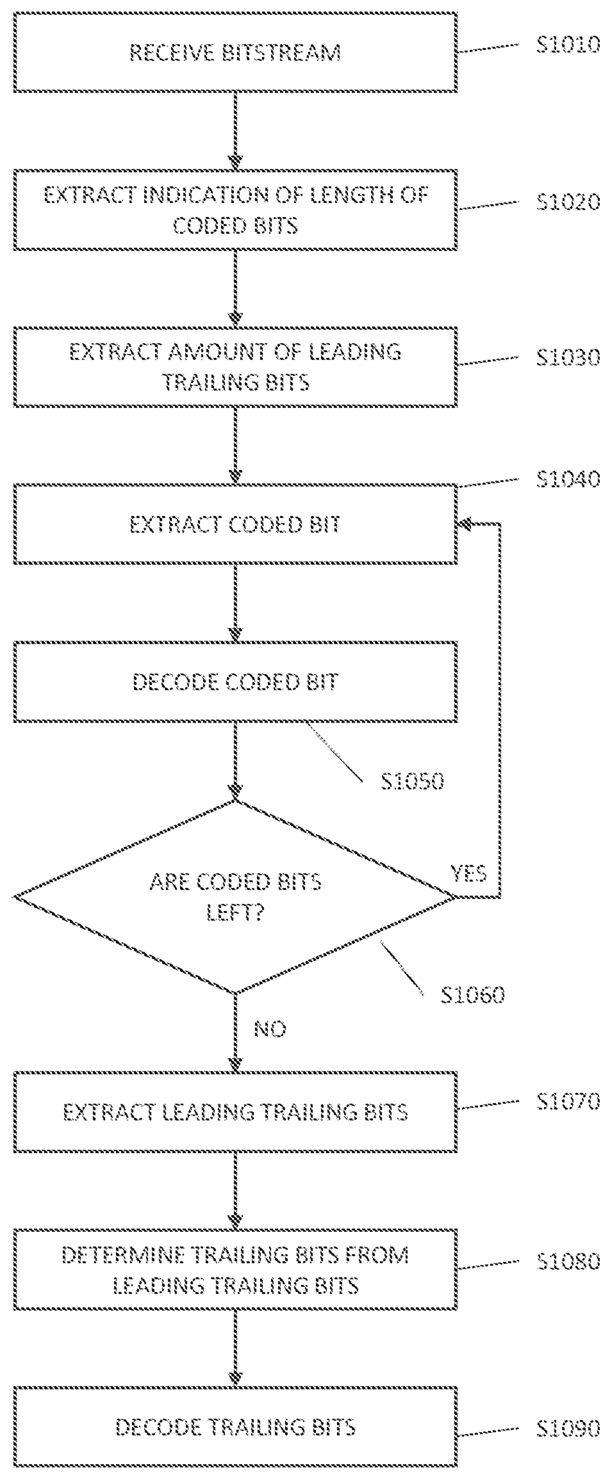
FIG. 10 is a flow diagram illustrating a decoding method.

FIG. 10 is a flow diagram illustrating a method for arithmetic decoding of data from a bitstream 1750. The decoder receives a bitstream S1010 from which an indication of the length of coded bits may be extracted S1020. The coded bits 1730-1731 are extracted from the bitstream and decoded successively S1040-S1060. When all coded bits are decoded, the leading trailing bits 1740-1741 are extracted S1070 according to their amount indication 1720-1721 that may also be extracted from the bitstream S1030. From the leading trailing bits 1660, the full trailing bits 1650 need to be recovered S1080 in order to be decoded. The leading trailing bits 1660 are padded with zeros up to a predefined maximum length of trailing bits. The recovered trailing bits can be decoded S1090.

Another implementation is that if there is enough memory available, a full substream can be formed before decoding. The coded bits and the leading trailing bits are extracted from the bitstream. The trailing bits can be recovered as described above. The coded bits and the determined trailing bits for the substream. The full substream is subsequently decoded.

However, the present invention is not limited to any of these implementations.

If the bit one 1670 that follows the identical leading bits 1660 within the trailing bits 1650 was not signaled, it needs to be included in the determination process of the trailing bits. The bit one 1670 is appended to the leading trailing bits 1660 before the padding 1680.

The indication of the amount of leading trailing bits 1720-1721 may precede not only the leading trailing bits 1740-1741, but also the coded bits 1730-1731 within the bitstream 1750.

The method for arithmetic decoding may be also performed on multiple substreams separately. To recover the individual substreams for decoding, first coded bits 1730 and second coded bits 1731 followed by first leading trailing bits 1740 and second leading trailing bits 1741 are extracted. The first coded bits 1730 and the first leading trailing bits 1740 form a first substream and the second coded bits 1731 and the second leading trailing bits 1741 form a second substream. For each substream the trailing bits are determines as explained above for a single substream. Each substream is decoded individually.

The first coded bits 1730 and the second coded bits 1731 may be extracted together with indications for their respective lengths, called a first length indication 1710 and a second length indication 1720.

The first length indication of the coded bits 1710 may precede the first coded bits 1730 within the bitstream 1750 and the second length indication 1711 precedes the second coded bits 1731. In addition, the second length indication 1711 may also precede the first coded bits 1730.

The indication of the amount of the second trailing bits 1721 may also precede the first coded bits 1730.

After the extraction of the first coded bits 1730, the second coded bits 1731, the first leading trailing bits 1740 and the second leading trailing bits 1741 there may be remaining bits that can be discarded. Bits that are left in the bitstream 1750 after the extraction of the last trailing bits are the result of padding the entire bitstream 1750 to match an integer of a predetermined number of bits.

The arithmetic decoding may be performed in parallel, for example by a multi-core decoder. In addition, only parts of the arithmetic decoding may be performed in parallel.

The method of arithmetic decoding may be realized as a range coding.

The arithmetic coding of the present disclosure may be readily applied to encoding of feature maps of a neural network or in classic picture (still or video) encoding and decoding. The neural networks may be used for any purpose, in particular for encoding and decoding or pictures (still or moving), or encoding and decoding of picture-related data such as motion flow or motion vectors or other parameters. The neural network may also be used for computer vision applications such as classification of images, depth detection, segmentation map determination, object recognition of identification or the like.

The method of the entropy coding of multiple channels described in the section above may be combined with the handling of trailing bits which is describe in the present section. The first and second substreams are formed by the first and second coded bits, respectively, which include the multiplexed and encoded portions. The trailing bits referred to in the "entropy coding of multiple channels" may correspond to the leading trailing bits, which are leading encoder status bits. The determined amount of the leading encoder status bits is indicated within the trailing bits length indication.

Implementation within Picture Coding

Figure 11:
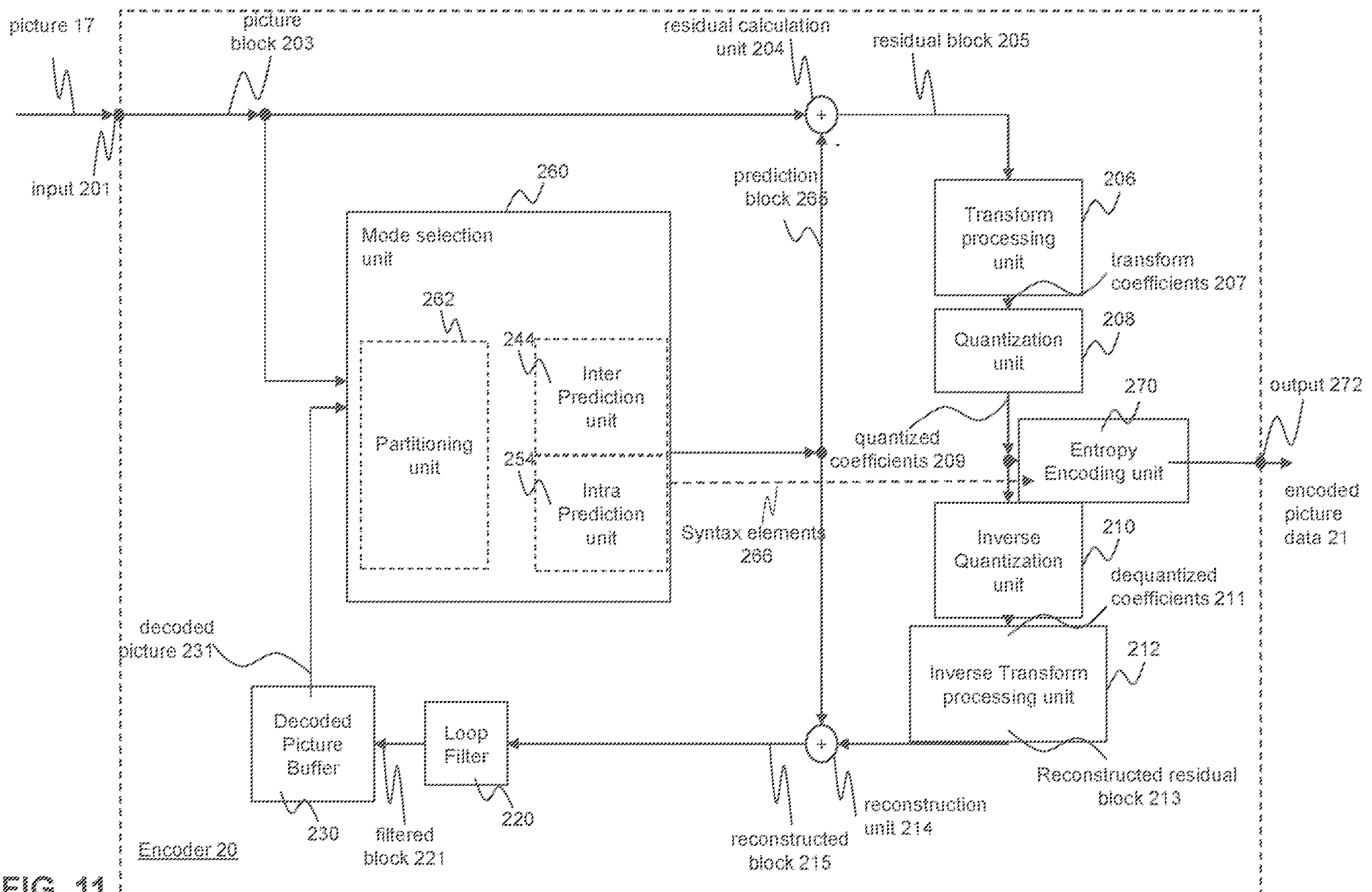
FIG. 11 is a block diagram illustrating employing the arithmetic encoding of some embodiments in a picture encoding.
Figure 12:
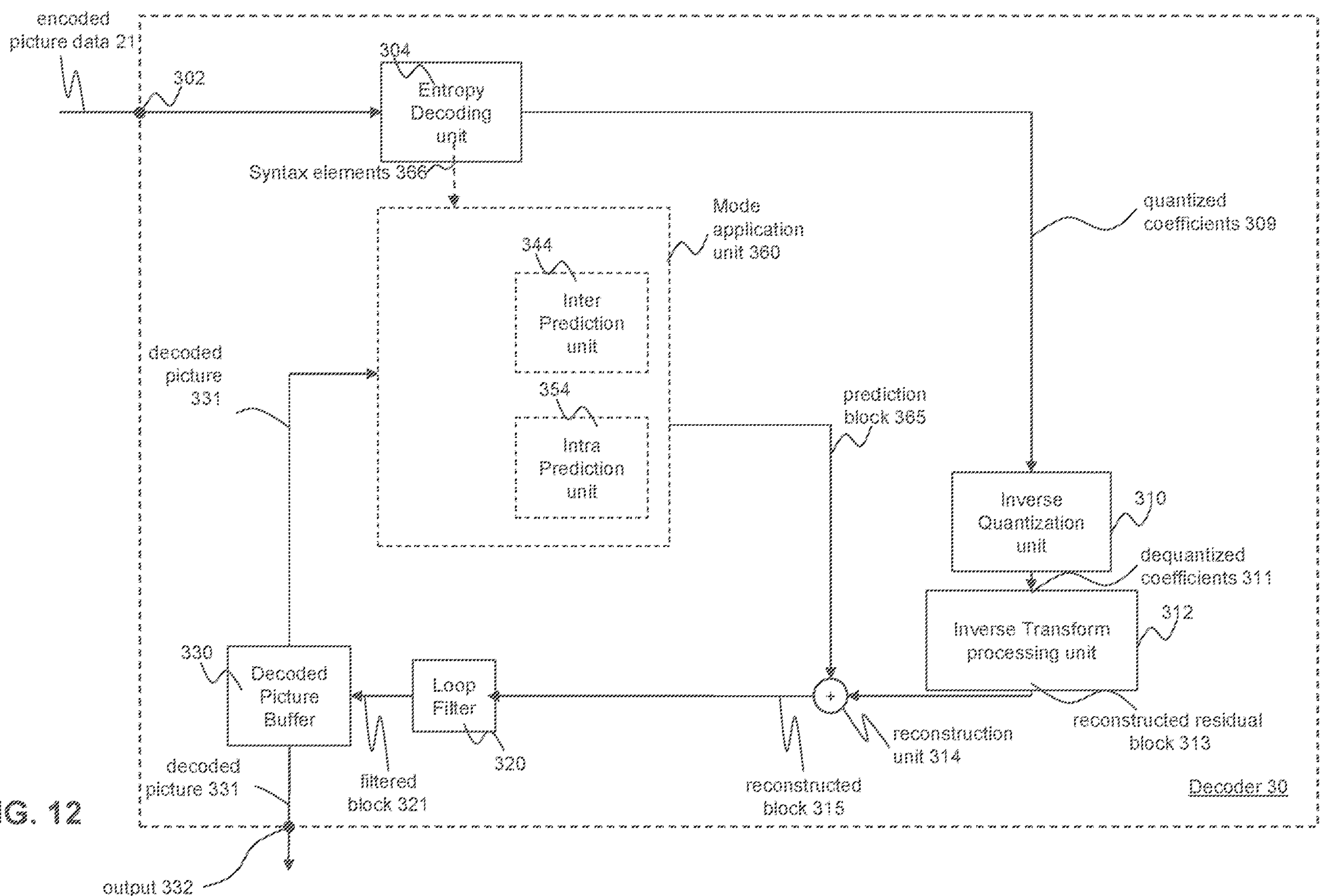
FIG. 12 is a block diagram illustrating employing the arithmetic encoding of some embodiments in a picture decoding.

One possible deployment can be seen in FIGS. 11 and 12.

FIG. 11 shows a schematic block diagram of an example video encoder 20 that is configured to implement the techniques of the present application. In the example of FIG. 11, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The entropy coding 270 may implement the arithmetic coding methods or apparatuses as described above.

The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 11 may also be referred to as hybrid video encoder or a video encoder according to a hybrid video codec.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 11) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks. The abbreviation AVC stands for Advanced Video Coding.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 11 may be configured to encode the picture 17 block by block, e.g. the encoding and prediction is performed per block 203.

Embodiments of the video encoder 20 as shown in FIG. 11 may be further configured to partition and/or encode the picture using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 11 may be further configured to partition and/or encode the picture using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

FIG. 12 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 12), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used. The entropy decoding may implement any of the above mentioned arithmetic decoding methods or apparatuses.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Embodiments of the video decoder 30 as shown in FIG. 12 may be configured to partition and/or decode the picture using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 12 may be configured to partition and/or decode the picture using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Implementations in Hardware and Software

Some further implementations in hardware and software are described in the following.

Any of the encoding devices described above with references to FIGS. 19-22 may provide means in order to carry out the arithmetically encoding of input data into coded bits and leading trailing bits. A processing circuitry within any of these devices is configured to encode the input data and to determine the leading trailing bits of the encoder status after encoding the last bit of the coded bits according to the method described above.

The decoding devices in any of FIGS. 19-22, may contain a processing circuitry, which is adapted to perform the decoding method. The method as described above comprises the extraction of coded bits and leading trailing bits together with indications of their respective amounts. The trailing bits are reconstructed from the leading trailing bits and they can be decoded together with the coded bits to obtain the data.

Summarizing, methods and apparatuses are described to encode data into a bitstream and to decode data from a bitstream. The method is able to reduce the length of the bitstream by including only the relevant significant bits within the trailing bits of the encoding process. The amount of these leading trailing bits is determined and the trailing bits, which have the least amount, can be constructed. Indications of the amount of leading trailing bits are included into the bitstream. Therefore, padding is not required, resulting in less bits, which need to be signaled.

According to an embodiment an encoding method is provided for entropy encoding data of a plurality of channels of a same size into a bitstream, comprising: multiplexing portions of a first size from each of the channels out of the plurality of channels, and subsequently encoding the multiplexed portions of the first size into a first substream; multiplexing portions of a second size from each of the channels out of the plurality of channels, and subsequently encoding the multiplexed portions of the second size into a second substream; wherein the encoding is an entropy encoding performed independently into the first substream and into the second substream.

The multiplexing and encoding of portions from different channels instead of encoding each channel separately, provides the possibility to yield completed substreams faster and/or to control the lengths of individual substreams, e.g., to obtain more uniform lengths of substreams. This opens the possibility to perform the entropy encoding and/or the entropy decoding in parallel for a plurality of substreams.

In an implementation, the encoding method is further comprising a step of generating the plurality of channels of the same size including pre-processing data of a plurality of channels of different sizes to obtain said plurality of channels of the same size.

The option to obtain channels of the same size from channels of any size provides an applicability of the method for different kinds of input data.

For example, the encoding method is further comprising multiplexing the first substream and the second substream into the bitstream together with a first substream length indication indicating length of the first substream, and a second substream length indication indicating length of the second substream.

Indicating the length of the substreams in the bitstream enables provision of substreams with different sizes and may thus lead to a more flexible bitstream composition.

In an embodiment, the first substream length indication precedes the first substream within the bitstream, and the second substream length indication precedes the second substream within the bitstream.

This feature avoids the need to buffer the full bitstream in order to extract individual substreams.

For example, the second substream length indication precedes the first substream within the bitstream.

This bitstream structure including concatenated length indications before the first substream may provide a more efficient extraction of substreams from the bitstream.

In an implementation, the entropy encoding is an arithmetic encoding.

Arithmetic encoding is an efficient entropy coding which may contribute to reduction of the rate.

In an implementation, the encoding method is further comprising multiplexing the first substream and the second substream into the bitstream together with a first trailing bits length indication indicating length of first trailing bits of the first substream, and a second trailing bits length indication indicating length of second trailing bits of the second substream.

The trailing bits, which are the status of the encoder after encoding the last portion, may be signaled separately from the substream. This provides the possibility for an additional treatment of the trailing bits.

For example, the first trailing bits length indication precedes the first substream within the bitstream, and the second trailing bits length indication precedes the second substream within the bitstream.

An advantage of this bitstream structure may be the possibility of immediate encoding of the substream without need to buffer a plurality of substreams and the respective indications.

For example, the second trailing bits length indication precedes the first substream within the bitstream.

Such a bitstream structure provides a further possibility for a faster extraction of individual parts of the bitstream.

In an implementation, the encoding method is further comprising: appending the first trailing bits to the bitstream following the first substream, and appending the second trailing bits to the bitstream following the second substream.

This bitstream structure allows for decoding the first substream and the corresponding trailing bits without the extraction of another substream.

For example, the first trailing bits follow the second substream within the bitstream.

Such a bitstream structure allows to start the decoding of individual substreams before the extraction of the trailing bits from the bitstream.

In an implementation, the encoding method is further comprising padding the bitstream including the first substream length indication, the second substream length indication, the first trailing bits length indication, the second trailing bits length indication, first substream, the second substream, the first trailing bits and the second trailing bits with bits having predetermined values so as to align the bitstream length to match an integer multiple of a predetermined amount of bytes.

This implementation may provide a bitstream e.g. appropriately aligned for further processing such as encapsulation into network adaption layer units or other packets.

For example, wherein the first size equals to the second size.

Using portions of the same size may result in a more efficient performance, as, for example, a memory unit suitable for hardware and software implementation could be used.

In an implementation, all portions included into the first substream and all portions included into the second substream, are an integer multiple, K, of symbols of said data of the plurality of channels, K being larger than 1.

Such approach may provide for an efficient implementation in software and/or hardware.

For example, the symbols are bits.

In an implementation, the encoding method is further comprising: selecting and subsequently applying a shuffling method for the multiplexing of the portions of the first size and the portions of the second size, wherein the shuffling method: is selected out of a set of predefined shuffling methods, and specifies the order of the portions of the first size and the portions of the second size.

The portions may be shuffled in order to achieve more uniform distribution of substream sizes.

For example, the shuffling method performs a cyclic permutation of the portions of the second size with respect to the portions of the first size.

Such a shuffling method may lead to more uniform lengths of substreams be easily implemented.

For example, the encoding method is, performed repeatedly, wherein the shuffling method is selected according to: a difference between a length of the current first substream and a statistic value based on lengths of past first substreams, and/or a difference between a length of the current second substream and a statistic value based on lengths of past second substreams.

The shuffling may be performed repeatedly over portions to be encoded to reduce differences in length between the substreams over time.

For example, the statistic value is based on at least one of estimated mean, median, minimum, maximum, or the speed of growing.

These statistics may provide suitable means to control the shuffling and thus, the substream size. In addition, this may allow for a more uniformly loading within streaming processes.

In an implementation, the entropy encoding is arithmetic encoding, and the shuffling method is selected according to a current state of a range interval in the arithmetic encoding.

This method may consider whether the value of the current range of the interval of the arithmetic encoder is close to the predetermined minimum range for encoding. This may avoid renormalizations during the encoding.

In an implementation, the entropy encoding includes generating the first substream with a first entropy encoder and generating the second substream with a second entropy encoder, and the entropy encoding with the first entropy encoder and the second entropy encoder are performed at least partially in parallel.

A parallel encoding of substreams may result in a faster encoding of the full bitstream.

For example, the channels are output channels or latent representation channels of a neural network.

Neural networks typically provide channels of the same size or at least of a fixed size, which makes the embodiments and examples above particularly suitable and readily applicable to these channels.

In an implementation, the entropy encoding is arithmetic encoding, and the method includes for the encoding of multiplexed portions into the first substream or the second substream: arithmetically encoding the multiplexed portions into coded bits and encoder status bits; wherein the coded bits form the substream; determining a minimum value and a maximum value of an interval of the arithmetically encoded input data; determining an amount of leading trailing bits which: are consecutive encoder status bits, and have the same value within first Most Significant Bits, MSBs, representing the determined maximum value as within second MSBs representing the determined minimum value; wherein the trailing bits are the leading encoder status bits; and indicating the determined amount of the leading encoder status bits within the trailing bits length indication.

The inclusion of the leading trailing bits instead of the full trailing bits into the bitstream may reduce the amount of bits within the bitstream and thus reducing rate, e.g., reduce the amount of bits to be signaled rate at the same quality.

For example, the amount of the leading encoder status bits, NumTrailingBits, is determined by: NumTrailingBits=CLZ((LOW+RANGE−1) XOR LOW), CLZ( ) is count of leading zeros, LOW is the minimum value of the interval and RANGE is the range of the interval.

The amount of leading trailing bits may be determined exactly instead of, for example, rounding to the nearest byte boundary, which may further reduce the amount of bits within the bitstream.

In an implementation, to the leading encoder status bits, one bit with value one is postpended before the inclusion into the bitstream.

Such approach may comply with the usual practice any be used alternatively to leaving out the one-value bit.

For example, during the arithmetic encoding current minimum value and the current maximum value of the interval are stored in a memory of a preconfigured size; the including the coded bits into the bitstream includes moving a predefined amount of bits out of stable bits from the memory into the bitstream; and the stable bits are consecutive bits which have the same value in MSBs of the binary representation of the current minimum value and the current maximum value.

Such an independent application of the method on two separate substreams provides a prerequisite for parallelization.

In an implementation, in case that during the arithmetic encoding a difference between the amount of leading encoder status and the predefined amount of bits out of stable bits is below a predefined threshold; trailing coded bits are generated from the leading encoder status bits by postpending one bit with value one followed by zeros up to the predefined amount of bits out of stable bits; the trailing coded bits are included into the coded bits before the inclusion of the coded bits into the bitstream; and an indication of zero leading encoder status bits is included into the bitstream.

Thus, the expensive signaling of many leading trailing bits together with the indication of the amount of trailing bits may be avoided. Instead it may be cheaper to have more coded bits and signal zero leading trailing bits.

In an implementation, the arithmetic encoding is a range encoding.

Range encoding may be particularly suitable for hardware and software architectures with limited register or generally fast memory size.

According to an embodiment, a decoding method is provided for entropy decoding a bitstream into data of a plurality of channels of a same size, the method comprising: entropy decoding a first substream independently from a second substream, demultiplexing portions of a first size and portions of a second size from the first substream and the second substream into the plurality of channels of the same size.

The multiplexing and encoding of portions from different channels instead of encoding each channel separately, provides the possibility to decode substreams of more uniform lengths. This opens the possibility to perform the entropy decoding in parallel for a plurality of substreams.

For example, the decoding method is further comprising a step of post-processing the plurality of channels of the same size to obtain data of a plurality of channels of different sizes.

The option to obtain data of channels of any size from channels of the same size provides an applicability of the method for different kinds of data.

In an implementation, the decoding method is further comprising extracting the first substream and the second substream from the bitstream together with a first substream length indication indicating length of the first substream, and a second substream length indication indicating length of the second substream.

Indicating the length of the substreams in the bitstream enables provision of substreams with different sizes and may thus lead to a more flexible bitstream composition.

In an implementation, the first substream length indication precedes the first substream within the bitstream, and the second substream length indication precedes the second substream within the bitstream.

An advantage of this bitstream structure may be the possibility of immediate encoding or decoding of the substream without need to buffer a plurality of substreams and the respective indications.

For example, the second substream length indication precedes the first substream within the bitstream.

Providing the length indications concatenated before the substreams may enable a faster extraction of individual parts of the bitstream.

In an implementation, the entropy decoding is an arithmetic decoding.

Arithmetic encoding is an efficient entropy coding which may contribute to reduction of the rate.

In an implementation, the decoding method is further comprising extracting the first substream and the second substream from the bitstream together with a first trailing bits length indication indicating length of first trailing bits of the first substream, and a second trailing bits length indication indicating length of second trailing bits of the second substream.

Indicating the length of the substreams in the bitstream enables provision of substreams with different sizes and may thus lead to a more flexible bitstream composition.

For example, the first trailing bits length indication precedes the first substream within the bitstream, and the second trailing bits length indication precedes the second substream within the bitstream.

An advantage of this bitstream structure may be the possibility of immediate decoding of the substream without need to buffer a plurality of substreams and the respective indications.

For example, the second trailing bits length indication precedes the first substream within the bitstream.

Such a bitstream structure provides a further possibility for a faster extraction of individual parts of the bitstream.

In an implementation, the first trailing bits follow the first substream within the bitstream, and the second trailing bits follow the second substream within the bitstream.

This bitstream structure allows for decoding the first substream and the corresponding trailing bits without the extraction of another substream.

For example, the first trailing bits follow the second substream within the bitstream.

Such a bitstream structure allows to start the decoding of individual substreams before the extraction of the trailing bits from the bitstream.

In an implementation, the first size equals to the second size.

Using portions of the same size may result in a more efficient performance, as, for example, a memory unit suitable for hardware and software implementation could be used.

For example, all portions included into the first substream and all portions included into the second substream, are an integer multiple, K, of symbols of said data of the plurality of channels, K being larger than 1.

Such approach may provide for an efficient implementation in software and/or hardware.

For example, the symbols are bits.

In an implementation, the encoding method is further comprising discarding the remaining bits of the bitstream after extracting the first substream length indication, the second substream length indication, the first trailing bits length indication, the second trailing bits length indication, first substream, the second substream, the first trailing bits and the second trailing bits.

Such approach may provide a bitstream e.g. appropriately aligned for further processing such as encapsulation into network adaption layer units or other packets.

In an implementation, the decoding method is further comprising: determining and applying a shuffling method for the demultiplexing of the portions of the first size and the portions of the second size, wherein the shuffling method: is one out of a set of predefined shuffling methods, and specifies the order of the portions of the first size and the portions of the second size.

The portions may be shuffled in order to achieve more uniform distribution of substream sizes.

For example, the determining of the shuffling method is based on control information included in the bitstream.

In order to shuffle the portions on the decoder side correctly, the shuffling methods used at the encoder side may be signaled within the bitstream.

In an implementation, the entropy decoding includes decoding the first substream with a first entropy decoder and decoding the second substream with a second entropy decoder, and the entropy decoding with the first entropy decoder and the second entropy decoder are performed at least partially in parallel.

A parallel decoding of substreams may result in a faster decoding of the full bitstream.

For example, the channels are output channels or latent representation channels of a neural network.

Neural networks typically provide channels of the same size or at least of a fixed size, which makes the embodiments and examples above particularly suitable and readily applicable to these channels.

In an implementation, the entropy decoding is arithmetic decoding, and the method includes for the decoding of multiplexed portions from the first substream or the second substream: extracting an amount of leading encoder status bits from the trailing bits length indication; wherein the substream includes coded bits and the trailing bits are leading encoder status bits; determining encoder status bits including postpending to the extracted leading encoder status bits zeros up to a predetermined maximum length of the encoder status bits; and arithmetically decoding of multiplexed portions from bits including the coded bits and the determined encoder status bits.

The reconstruction of the trailing bits from the leading encoder status bits provides the decoding from coded bits and trailing bits by using a smaller amount of bits within the bitstream.

For example, the determining of the encoder status bits consists of postpending to the extracted leading encoder status bits one bit with value one, followed by zeros up to the predetermined maximum length of the encoder status bits.

This approach enables reconstructing the complete output of the arithmetic encoder and thus provide an appropriate input to an arithmetic decoder.

In an implementation, the arithmetic decoding is a range decoding.

Range encoding may be particularly suitable for hardware and software architectures with limited register or generally fast memory size.

In an implementation, a computer program stored on a non-transitory medium and including code instructions, which, when executed on one or more processors, cause the one or more processor to execute steps of any of the methods described above.

According to an embodiment apparatus for entropy encoding data of a plurality of channels of a same size into a bitstream, comprising: processing circuitry configured to: multiplex portions of a first size from each of the channels out of the plurality of channels, and subsequently encode the multiplexed portions of the first size into a first substream; multiplex portions of a second size from each of the channels out of the plurality of channels, and subsequently encode the multiplexed portions of the second size into a second substream; wherein the encoding is an entropy encoding performed independently into the first substream and into the second substream.

According to an embodiment apparatus for entropy decoding a bitstream into data of a plurality of channels of a same size, comprising: processing circuitry configured to: entropy decode a first substream independently from a second substream, demultiplex portions of a first size and portions of a second size from the first substream and the second substream into the plurality of channels of the same size.

The apparatuses provide the advantages of the methods described above.

Any of the encoding devices described above with references to FIGS. 19-22 may provide means in order to carry out the multiplexing of portions of a first size from each of the channels and out the multiplexing of portions of a second size from each of the channels. A processing circuitry within any of these devices is configured to subsequently encode the multiplexed portions into substreams and to perform this entropy coding independently into a first substream and a second substream.

The decoding devices in any of FIGS. 19-22, may contain a processing circuitry, which is adapted to perform the decoding method. The method as described above comprises the entropy decoding of a first substream independently from a second substream and demultiplexing portions of a first size and portions of a second size from the first substream and the second substream into data of a plurality of channels.

Summarizing, methods and apparatuses are described to encoded data into a bitstream and to decode data from a bitstream. The method is able to perform parallel encoding and decoding efficiently and avoids padding of substreams thus reducing the amount of bits within the bitstream. Portions of input data channels are multiplexed and encoded into substreams. During the multiplexing shuffling methods are applied in order to obtain substreams of more uniform lengths. The amount of bits within the substream may be further reduced by including only the relevant significant bits within the trailing bits of the encoding process.

In the following embodiments of a video coding system 10, a video encoder 20 and a video decoder 30 are described based on FIGS. 19 and 20, with reference to the above mentioned FIGS. 11 and 12 or other encoder and decoder such as a neural network based encoder and decoder.

Figure 19:
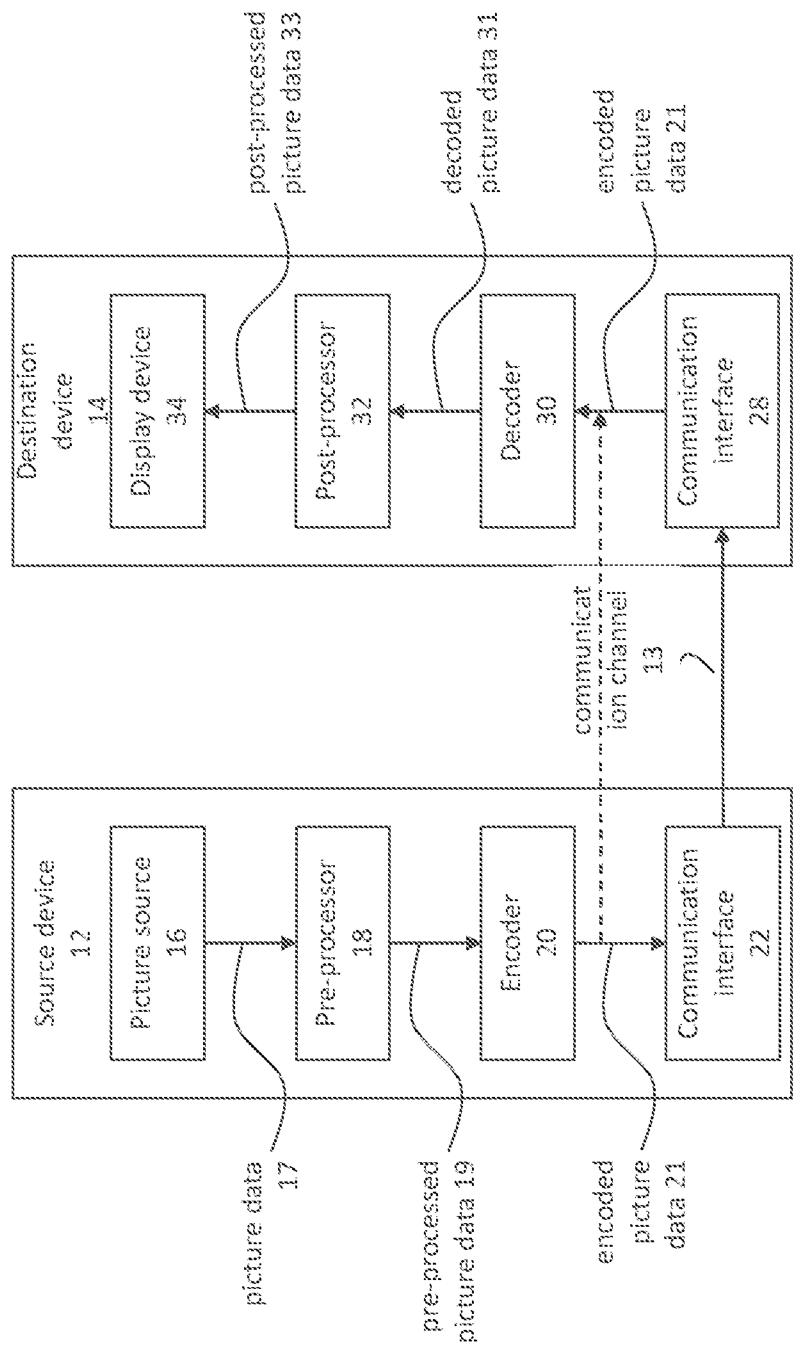
FIG. 19 is a block diagram showing an example of a video coding system configured to implement embodiments of the present disclosure.

FIG. 19 is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 19, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details were described above, e.g., based on FIG. 11).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 19 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details were described above, e.g., based on FIG. 12).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 19 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 19 may vary depending on the actual device and application.

Figure 20:
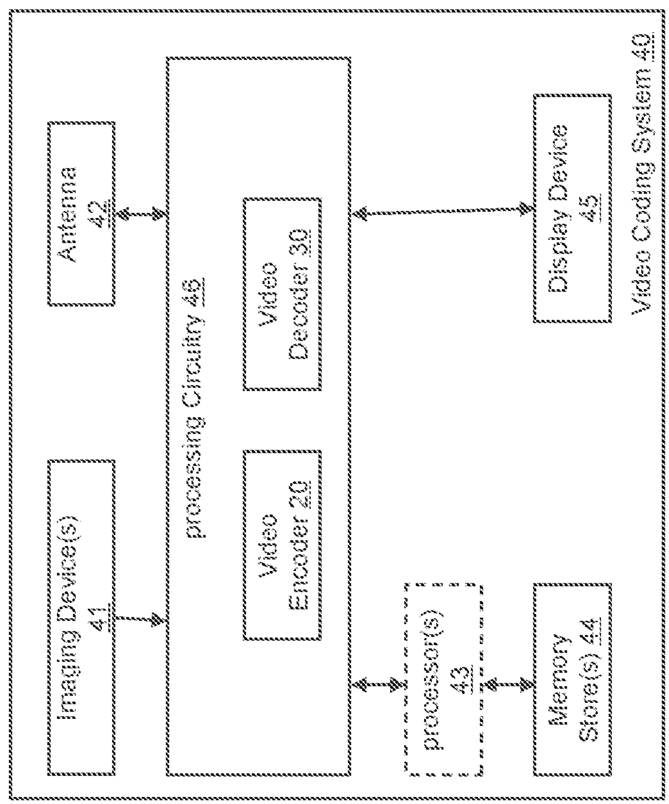
FIG. 20 is a block diagram showing another example of a video coding system configured to implement embodiments of the present disclosure.
Figure 22:
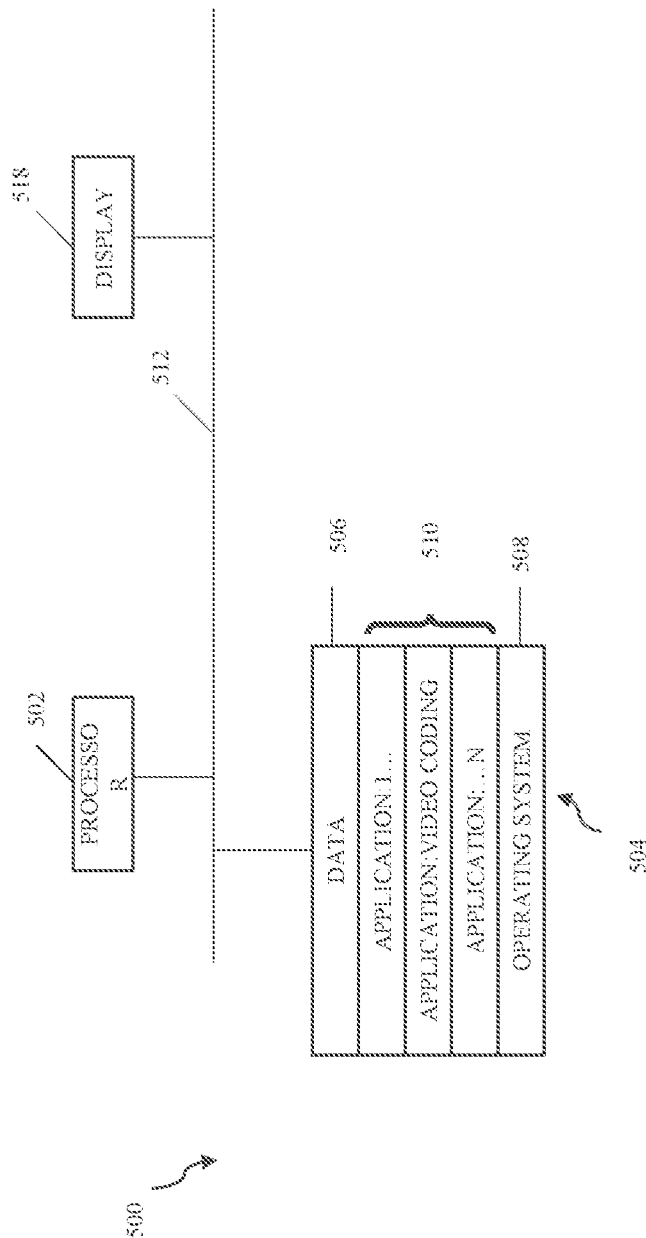
FIG. 22 is a block diagram illustrating another example of an encoding apparatus or a decoding apparatus.

The encoder 20 (e.g. a video encoder 20) or the decoder 30 (e.g. a video decoder 30) or both encoder 20 and decoder 30 may be implemented via processing circuitry as shown in FIG. 20, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 11 and/or any other encoder system or subsystem described herein. The decoder 30 may be implemented via processing circuitry 46 to embody the various modules as discussed with respect to decoder 30 of FIG. 12 and/or any other decoder system or subsystem described herein. The processing circuitry may be configured to perform the various operations as discussed later. As shown in FIG. 22, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 20.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 19 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the present disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Figure 21:
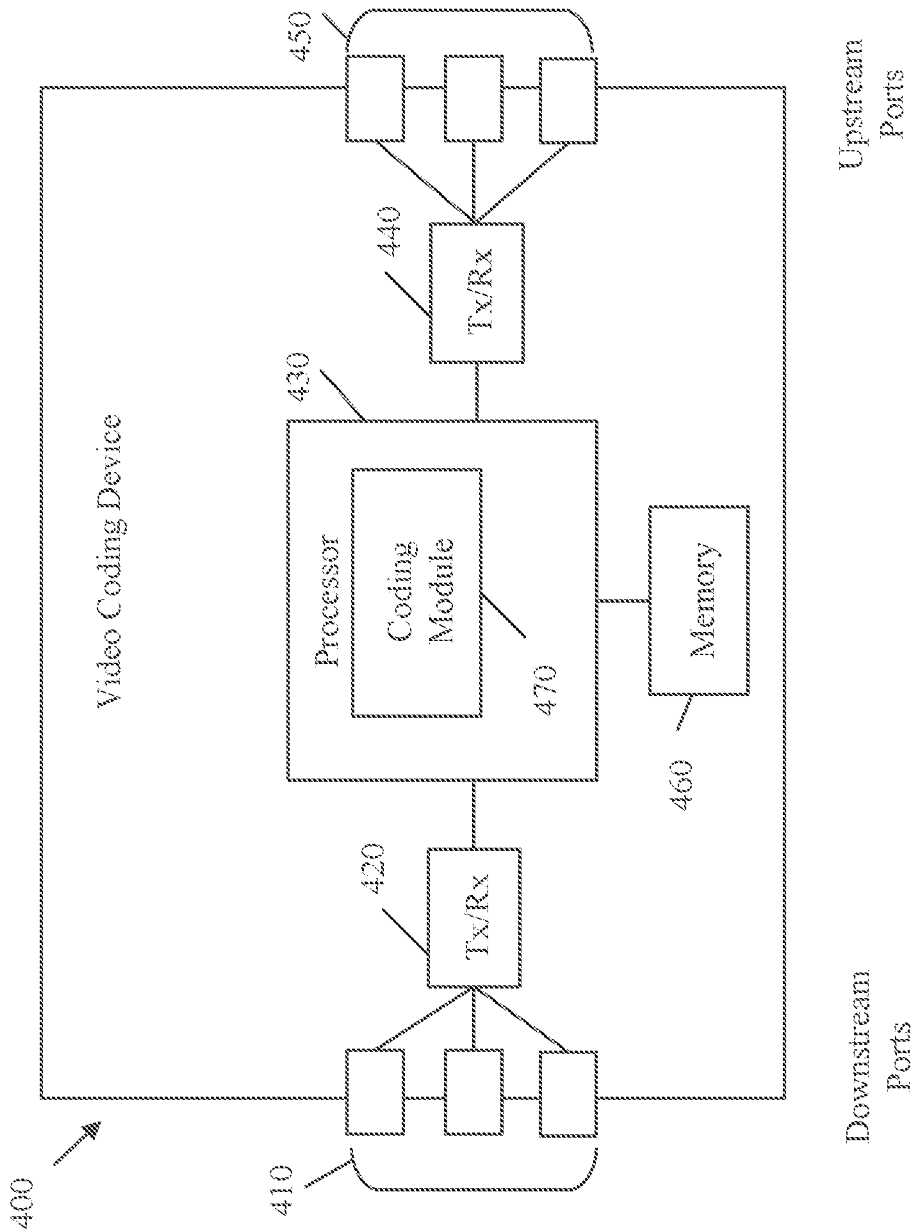
FIG. 21 is a block diagram illustrating an example of an encoding apparatus or a decoding apparatus.

FIG. 21 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 19 or an encoder such as video encoder 20 of FIG. 19.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAS, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 22 is a simplified block diagram of an apparatus 500 that may be used as either or both of the source device 12 and the destination device 14 from FIG. 19 according to an embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described herein, including the encoding and decoding using arithmetic coding as described above.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Although embodiments of the present disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for arithmetic encoding of input data into a bitstream, wherein the method is applied to an electronic device and comprises:

arithmetically encoding the input data into coded bits and trailing bits;

including into the bitstream, the coded bits;

determining a minimum value and a maximum value of an interval of the arithmetically encoded input data;

determining an amount of leading trailing bits, the leading trailing bits being consecutive bits having a same value within a first amount of Most Significant Bits (MSBs) of bits representing the determined maximum value as within a second amount of MSBs of bits representing the determined minimum value, the first amount of MSBs and the second amount of MSBs being equal; and including into the bitstream, an indication of the amount of the leading trailing bits and the leading trailing bits.

2. The method according to claim 1, wherein the amount of the leading trailing bits, NumTrailingBits, is determined by the following:

$$\text{NumTrailingBits}=\text{CLZ}((\text{LOW}+\text{RANGE}-1)\,\text{XOR}\,\text{LOW}),$$

wherein CLZ( ) is count of leading zeros, LOW is the minimum value of the interval and RANGE is the range of the interval.

3. The method according to claim 1, wherein the indication of the amount of the leading trailing bits precedes the coded bits and the leading trailing bits within the bitstream.

4. The method according to claim 1, wherein for the leading trailing bits, one bit with value one is postpended before being included into the bitstream.

5. The method according to claim 1, wherein the arithmetically encoding the input data, the determining the minimum value and the maximum value of the interval, and the determining the amount of leading trailing bits are performed separately for a first substream and a second substream, resulting in first coded bits, second coded bits, first leading trailing bits and second leading trailing bits; and wherein the method further includes:

inserting, into the bitstream, the first coded bits and the second coded bits followed by the first leading trailing bits and the second leading trailing bits.

6. The method according to claim 5, further comprising:

multiplexing the first coded bits and the second coded bits into the bitstream together with a first length indication indicating a length of the first coded bits, and a second length indication indicating a length of the second coded bits.

7. The method according to claim 6, wherein the first length indication precedes the first coded bits within the bitstream and the second length indication precedes the second coded bits within the bitstream.

8. The method according to claim 7, wherein the second length indication precedes the first coded bits within the bitstream, and wherein the indication of the amount of the second leading trailing bits precedes the first coded bits within the bitstream.

9. The method according to claim 5, further comprising:

padding the bitstream including the first coded bits, the second coded bits, the first leading trailing bits and the second leading trailing bits with bits having predetermined values so as to align the bitstream length to match an integer multiple of a predetermined amount of bytes.

10. The method according to claim 5, wherein the arithmetically encoding includes encoding the first substream with a first arithmetic encoder and encoding the second substream with a second arithmetic encoder, and the arithmetically encoding with the first arithmetic encoder and the second arithmetic encoder are performed at least partly in parallel.

11. The method according to claim 1, wherein the arithmetically encoding is a range encoding.

12. A method for arithmetic decoding of data from a bitstream, wherein the method is applied to an electronic device and comprises:

extracting an indication of an amount of leading trailing bits from the bitstream;

extracting a plurality of coded bits from the bitstream;

extracting, from the bitstream, the leading trailing bits specified by the extracted indication of the amount of the leading trailing bits;

determining trailing bits including postpending to the extracted leading trailing bits zeros up to a predetermined maximum length of the trailing bits; and arithmetically decoding a coded value represented by bits including the coded bits and the determined trailing bits, to obtain the data, wherein the leading trailing bits are consecutive bits having a same value in a first amount of Most Significant Bits (MSBs) of bits representing a maximum value and a second amount of MSBs of bits representing a minimum value of an arithmetic encoding interval, the first amount of MSBs and the second amount of MSBs being equal.

13. The method according to claim 12, wherein the determining of the trailing bits further includes: postpending to the extracted leading trailing bits one bit with value one, followed by zeros up to the predetermined maximum length of the trailing bits.

14. The method according to claim 12, wherein the indication of the amount of the leading trailing bits precedes the coded bits and the leading trailing bits within the bitstream.

15. The method according to claim 12, further comprising:

extracting, from the bitstream, first coded bits and second coded bits followed by first leading trailing bits and second leading trailing bits, wherein the first coded bits and the first leading trailing bits form a first substream, and wherein the second coded bits and the second leading trailing bits form a second substream; and determining first trailing bits for the first substream, determining second trailing bits the second substream, arithmetically decoding a first coded value represented by first bits including the first coded bits and the determined first trailing bits; and arithmetically decoding a second coded value represented by second bits including the second coded bits and the determined second trailing bits.

16. The method according to claim 15, further comprising:

extracting the first coded bits and the second coded bits from the bitstream together with a first length indication indicating a length of the first coded bits, and a second length indication indicating a length of the second coded bits.

17. The method according to claim 16, wherein the first length indication precedes the first coded bits within the bitstream, and the second length indication precedes the second coded bits within the bitstream.

18. The method according to claim 17, wherein the second length indication precedes the first coded bits within the bitstream.

19. The method according to claim 18, wherein the indication of the amount of the second leading trailing bits precedes the first coded bits within the bitstream.

20. The method according to claim 15, further comprising:

discarding the remaining bits of the bitstream after extracting the first coded bits, the second coded bits, the first leading trailing bits and the second leading trailing bits.

21. The method according to claim 15, wherein the arithmetic decoding includes decoding the first substream with a first arithmetic decoder and decoding the second substream with a second arithmetic decoder, and the arithmetic decoding with the first arithmetic decoder and the arithmetic decoding with the second arithmetic decoder are performed at least partly in parallel.

22. The method according to claim 12, wherein the arithmetic decoding is a range decoding.

23. A non-transitory computer readable medium having code instructions stored thereon, which, upon execution by one or more processors, cause the one or more processor to perform the method according to claim 1.

24. An apparatus for arithmetic encoding of input data into a bitstream, comprising:

processing circuitry configured to:

arithmetically encode the input data into coded bits and trailing bits;

include the coded bits into the bitstream;

determine a minimum value and a maximum value of an interval of the arithmetically encoded input data;

determine an amount of leading trailing bits, the leading trailing bits being consecutive bits having a same value within a first amount of Most Significant Bits (MSBs) of bits representing the determined maximum value as within a second amount of MSBs of bits representing the determined minimum value, the first amount of MSBs and the second amount of MSBs being equal; and include into the bitstream an indication of the amount of the leading trailing bits and the leading trailing bits.

25. An apparatus for arithmetic decoding of data from a bitstream, comprising:

processing circuitry configured to:

extract an indication of an amount of leading trailing bits from the bitstream;

extract a plurality of coded bits from the bitstream;

extract, from the bitstream, the leading trailing bits specified by the extracted indication of the amount of the leading trailing bits;

determine trailing bits including appending to the extracted leading trailing bits zeros up to a predetermined maximum length of the trailing bits; and arithmetically decode a coded value represented by bits including the coded bits and the determined trailing bits, to obtain the data, wherein the leading trailing bits are consecutive bits having a same value in a first amount of Most Significant Bits (MSBs) of bits representing a maximum value and a second amount of MSBs of bits representing a minimum value of an arithmetic encoding interval, the first amount of MSBs and the second amount of MSBs being equal.

* * * * *